(12) United States Patent
Golubov

(10) Patent No.: US 6,503,086 B1
(45) Date of Patent: Jan. 7, 2003

(54) BODY MOTION TEACHING SYSTEM

(76) Inventor: Michael M. Golubov, 9 Birch Way, Cortlandt Manor, NY (US) 10567

( * ) Notice: Subject to any disclaimer, the term of this patent is extended or adjusted under 35 U.S.C. 154(b) by 0 days.

(21) Appl. No.: 09/557,129

(22) Filed: Apr. 25, 2000

(51) Int. Cl.[7] ................................................ G09B 9/00
(52) U.S. Cl. .......................................... 434/247; 463/7
(58) Field of Search ................................ 434/247–252, 434/256–258; 463/7; 439/322, 350

(56) References Cited

U.S. PATENT DOCUMENTS 6,293,802 B1 * 9/2001 Ahlgren ...................... 434/252
6,311,041 B1 * 10/2001 Goodyear ................... 434/350

* cited by examiner

Primary Examiner—Joe H. Cheng
Assistant Examiner—Kathleen M. Christman
(74) Attorney, Agent, or Firm—Davidson, Davidson & Kappel, LLC

(57) ABSTRACT

A computerized method for illustrating, to a user, a plurality of human body motions relating to a particular human physical activity provided. The method includes the steps of dividing the human physical activity into a plurality of motion segments; displaying, on a display screen, a menu including the plurality of motion segments, the display screen being coupled to a computer; accepting, as input to the computer from a user, a selection of one of the plurality of motion segments; and displaying, on the display screen, from at least two vantage points, a moving image of a generally human shaped actor performing the selected one of the plurality of motion segments. Preferably, an image of an instructor is simultaneously displayed on the display screen with the display of the moving image of the generally human shaped actor, and a corresponding audio narration of the moving image of the generally human shaped actor is provided via a sound generation device coupled to the computer.

23 Claims, 25 Drawing Sheets

BODY MOTION TEACHING SYSTEM

FIELD OF THE INVENTION

The present invention relates to the field of computerized systems for teaching the proper body motions for specific sports and athletic endeavors.

BACKGROUND OF THE INVENTION

Typically, in order to teach the proper body motions for a sport, a trainer demonstrates the proper body motion, and then observes as a student attempts to perform the same motion. The trainer then points out the differences orally or physically to the student.

In recent years, training videos have gained popularity as an alternative or supplement to interactive training between a trainer and student. In such videos, a trainer's performances are recorded on a video tape, along with an audio narration explaining the proper body motion to be performed. Such videos are available for a variety of sports and other athletic endeavors, including, for example, baseball, basketball, golf, weight training, and aerobic training.

Various forms of interactive video methods are also available in the art. In accordance with these systems, the student watches a video of the proper body motion, and then attempts to perform the same motion. The student's motion is monitored by a motion sensing device or recorded by a video camera, and the system provides an indication of whether the motion was performed correctly. Such systems are described, for example, in U.S. Pat. Nos. 5,904,484 and 5,846,086.

SUMMARY OF THE INVENTION

In accordance with the present invention, a computerized system and method is provided for illustrating, to a user, a plurality of human body motions relating to a particular human physical activity such as a sport or other athletic endeavor. Examples of such physical activities include, for example, baseball, basketball, golf, tennis, weight training, aerobics, and physical therapy. In accordance with the present invention, the human physical activity is divided into a plurality of motion segments, and a menu is displayed on a display screen of the computer which includes the plurality of motion segments. Using an input device, such as a computer mouse, a user selects one of the plurality of motion segments. In response, the computer displays, on the display screen, from at least two vantage points, a moving image of a generally human shaped actor performing the selected one of the plurality of motion segments.

The moving image is most preferably displayed from at least three (e.g., front, right side, left side), and in some cases four or five vantage points (e.g., front, back, top, left, and right). In a preferred embodiment, for at least some of the plurality of motion segments, the computer displays four panels on the screen, with each panel containing an image of the generally human shaped actor performing the motion from a different vantage-point. The images in the panels may move simultaneously or sequentially, depending upon the nature of the movement being taught, and the particular application.

Preferably, an image of an instructor is simultaneously displayed on the display screen with the display of the moving image of the generally human shaped actor, and a corresponding audio narration of the moving image of the generally human shaped actor is provided via a sound generation device (e.g., a speaker) coupled to the computer. The audio narration is preferably synchronized with movements and gestures of the instructor so that it appears that the instructor on the display screen is speaking to the user, and gesturing towards the generally human shaped actor, and in some instances, towards the user as well.

In the context of the present invention, the actor must be "generally" human shaped in that any body parts of the actor necessary for the illustrated motion should correspond in shape and relation to human body parts. Thus, for example, the actor could be an animated image having a head in the shape of a dog's head, provided that, to the extent head movement is an important component of the movement, the dog head is sized and shaped to allow the actor to demonstrate the proper movement to the user.

In accordance with the present invention, the generally human shaped actor may be either an animated image performing the selected motion or a video image of a living person (hereinafter referred to as a real life image) performing the selected motion. Combinations of animated images and real life images may also be used. For example, certain ones of the plurality of motion segments may be displayed as animated images and other ones of the plurality of motion segments may be displayed as real life images. In addition, certain ones of the plurality of motion segments may include a combination of animated and real life images. The use of both animated and real life images, either in separate motion segments or within the same motion segment, is preferred in that it allows the user to see a precise moving image of the appropriate motion (as provided by the animated image), as well as instilling confidence in the instruction method on the part of the user by showing a real person performing at least some of the motion segments.

The instructor may also be either an animated image or a real life image. Preferably, however, the instructor is animated so that his motions and gestures can be more easily choreographed with the movement of the generally human shaped actor.

In accordance with one embodiment of the present invention, the physical human activity is a sport, and most preferably a team sport such as baseball, basketball, or football, in which each team includes a plurality of player positions. In accordance with this embodiment, the sport is divided into a plurality of coaching sub-sessions relating to various skill categories and/or player position categories, and each sub-session is divided into a plurality of motion segments. For example, a system for providing baseball instruction in accordance with this embodiment might include player position sub-sessions such as pitcher, outfielder, and catcher; skill sub-sessions such as throwing, batting, and fielding ground balls; or a combination of both. The motion segments for a batting sub-session might include, for example, a batting grip motion segment, a ready phase motion segment, a collect phase motion segment, and a delivery phase motion segment.

In addition, the motion segment might be further divided into a plurality of even smaller motion segments. For example, instead of having a single delivery phase motion segment, there might be provided a delivery phase motion sub-category with the following motion segments: starting swing, making contact, inside pitch, pitch down the middle, outside pitch, follow through, back side unlocks, chin to shoulder, and finish.

More generally, physical human activities in accordance with the present invention can be divided into motions, and these motions can be further divided into sub-motions. For example, the game of golf might include, inter alia, a putting stroke motion, a tee shot motion, and a chip stroke motion. Each of these motions, in turn, can be viewed as including a plurality of sub-motions such as a back swing sub-motion, a swing sub-motion, and a follow-through sub-motion. Other, or further sub-motions are also possible. For purposes of the present invention, a motion is defined as a substantially contiguous movement, and a sub-motion is defined as a portion of a substantially contiguous movement. Moreover, the term motion segment, in the context of the present invention, is meant to encompass both motions and sub-motions.

Preferably, the system includes motion segments which illustrate incorrect motions as well as correct motions, thereby alerting the user to common errors. For example, in the baseball embodiment discussed above, a batting sub-session might include a batting error motion sub-category, with a plurality of common batting error motion segments. Alternatively, motion segments illustrating incorrect motions could be incorporated into other sub-categories. For example, a batting grip sub-category might include a bad grip motion segment.

In embodiments relating to team sports, the system preferably displays, on the display screen, a playing field with a plurality of players in appropriate player positions, and the user selects an appropriate sub-session by clicking (e.g., with a computer mouse) on the appropriate player. For example, in the case of baseball, a baseball field might be displayed with animated players in various player positions such as pitcher, outfielder, and batter. To select a batting sub-session, a user could simply click on the animated figure of the batter.

In accordance with another aspect of the present invention, the system may provide the user with the ability to pause and resume playing of the motion segments. For example, the system may display on the display screen, simultaneously with the moving image of the motion segment, a stop button and a resume button, wherein the stop button, when actuated by a mouse or other input device, causes the computer to pause the moving image, and wherein the resume button, when actuated by the mouse or other input device, causes the computer to resume playing of the moving image. Alternatively, a toggle button could be displayed which, when actuated, causes the computer to pause the moving image if the moving image is being played, and causes the computer to resume playing of the moving image if the moving image is paused.

In accordance with another aspect of the present invention, the system may be specifically directed to the instruction of sports skills to children, and be specifically marketed to children's baseball, basketball, or football leagues. In this regard, it is anticipated that the system would be of interest to parents and coaches, as well as the children themselves. In at least some of the motion segments which utilize real life images, applications directed to children most preferably demonstrates the motion with children of at least two, and most preferably three, age groups. This is particularly advantageous because the coordination and skill level of, for example, a 17 year old is substantially greater than the coordination of a 12 year old, and the coordination and skill level of a 12 year old is substantially greater than the coordination of a 7 year old. As such, it is beneficial to tailor the instruction to the age of the player. At the same time, it is desirable to provide instruction to different age groups in a single product so that the product can continue to be used by the purchaser as the player grows older. Another advantage of providing a single product for multiple age groups is that a single product can be used by siblings of different ages.

The computerized system and method in accordance with the present invention for illustrating, to a user, a plurality of human body motions can be sold, for example, as a CD ROM product containing a computer program which is executable on a computer. Other portable data storage mediums known in the art can also be used, including, for example, floppy disks and ZIP disks. Alternatively, the computer program could be downloaded to a computer via the Internet, or other global information network.

The system and method in accordance with the various embodiments of the present invention described above provides an instruction methodology which is substantially clearer to a user than prior art systems. By dividing the motions to be taught into motion segments, the user is able to focus more clearly on the body movements being taught. Moreover, the use of animated images to demonstrate body movements, combined with the ability to stop and start the motion of the animated image, allows the user to even more clearly see the subtleties of the movements being taught. The use of an animated agent, which can gesture and point to particular body parts of interest, in synchronization with the movement of the animated or real life images, further improves the clarity of the instruction.

In accordance with another aspect of the present invention, a system and method for marketing and selling software products is provided. In accordance with this method, the product is marketed by a non-profit organization to its prospective donors and members. The physical product itself, for example in the form of a CD ROM, is given to the prospective donors and members free of charge, thus eliminating the need for the non-profit organization to collect money at the time of transfer. The prospective donors and members are informed, either via the product packaging, or by the non-profit organization itself, that a portion of the purchase price of the product will be donated to the non-profit organization, with the remaining proceeds paid to the seller.

Once distributed, the software product is freely useable during a trial period by the donors, members, or any person in possession of the product. The trial period may be defined in a number of ways. For example, the trial period could expire on a date certain from the manufacture date of the product, on a date certain after the first use of the product, after a total specified time period of use (e.g. 2 hours) regardless of how many times the program is used (e.g., opened and closed); after a specified number of uses of the product; or a combination of the foregoing. Upon expiration of the trial period, the user must purchase the product in order to continue to use it.

In this regard, each product has a product identification number which is printed on the product packaging, on the product itself, or in an initial display screen of the software. Each product identification number, in turn, has a corresponding authorization code which is maintained by the seller of the product. In order to purchase the product, the user contacts the seller (for example, via the Internet or by telephone) and provides the seller with payment information (such as a credit card number) and the product identification number. In the case of a telephone transaction, upon completing the transaction, the seller provides the user with an authorization code. To use the product, the user simply starts the program, and enters the authorization code when prompted. In the case of an Internet purchase, the authorization may be electronically transmitted to the program, thereby eliminating the need for the user to enter the authorization code. In any event, based upon the product identification number, the seller identifies the sponsoring non-profit organization to which a donation is to be made. Moreover, the product identification number can also be used to determine the specific fee arrangement for the sponsoring organization (e.g., $5 per unit for the firs 50 units sold, $3 per unit thereafter). In a preferred embodiment of the present invention, the product identification number is comprised of two numbers: a product serial number and a purchase code, and the purchase code is used to identify the sponsoring organization and the serial number is used to identify the particular unit of product purchased. Most preferably, the product serial number is a randomly generated number which changes each time the program is used during the trial period.

In a particularly preferred embodiment, the product is a CD ROM disk containing an instructional program for teaching children a sport such as baseball, basketball, or football. In the United States, children's sports leagues are generally run as non-profit organizations. These organizations may be dedicated sports organizations, such as baseball "Little Leagues" or "Pop Warner" football leagues, or as part of larger organizations such as religious institutions. These organizations frequently rely on fund-raising drives to pay for equipment and other operational needs. In any event, the CD ROM product is offered to parents by the children's sports leagues during their fund-raising initiatives. The parents are informed that the CD ROM product, which provides instruction for the same children's sport that the parent has enrolled (or is considering enrolling) his or her child in, can be used for free during a trial period. The parents are also informed that if they choose to purchase the CD ROM at any point during or after the trial period, a portion of the sales price will be donated to the sports league.

This marketing method has a number of advantages. The product is being distributed to a customer base which has already committed significant resources, in terms of money and time, into the very children's sport to which the product is directed. In addition, by providing a trial period, the customers are not obligated to make an immediate purchase decision. The use of the trial period also encourages the customers to allow their children to sample the product, thereby increasing the likelihood of an eventual purchase. The fact that a portion of the purchase price of the product will be paid to the very same sports organization that their children belong to also increases the likelihood of an eventual sale.

DETAILED DESCRIPTION OF THE PREFERRED EMBODIMENTS

The preferred embodiments of the present invention will now be described in detail with reference to FIGS. 1 through 18. Although the system and method of the present invention will be described in connection with these preferred embodiments and drawings, it is not intended to be limited to the specific form set forth herein, but on the contrary, it is intended to cover such alternatives, modifications, and equivalents, as can be reasonably included within the spirit and scope of the invention as defined by the appended claims.

As set forth above, the present invention relates to a computerized system and method is provided for illustrating, to a user, a plurality of human body motions relating to a particular human physical activity such as a sport or other athletic endeavor. Examples of such physical activities include, for example, baseball, basketball, golf, tennis, weight training, aerobics, and physical therapy. Although the present invention is applicable to human physical activities in general, it is particularly useful with regard to the sports instruction.

A preferred embodiment of the present invention will now be described in detail with reference to a computerized system for teaching the proper body motions for various positions and skills of a baseball player. The system comprises a computer program which is executed on a computer (such as a PC, laptop, etc.), under the control of a data input device such as a keyboard or mouse, and provides a video output to a computer monitor or other video display device, and preferably provides audio output via one or more speakers. The system preferably displays, via a display screen, a combination of animated image and real life image motion to teach baseball skills to a number of age groups. An instructor (preferably displayed as an animated figure) narrates the proper movement for a particular skill, which movement is displayed as an animated image or as a real-life image of a human player. The movement is preferably displayed from a plurality of vantage points in order to allow the user of the system properly understand the subtleties of the movement. Most preferably, the movement is displayed from at least three (e.g., front, right side, left side), and in some cases four or five vantage points (e.g., front, back, top, left, and right). Additional vantage points can also be provided.

FIGS. 1–17 show illustrative screen displays for a preferred system in accordance with the present invention for teaching the proper body motions for a various skills and positions of a baseball player.

Figure 1A:
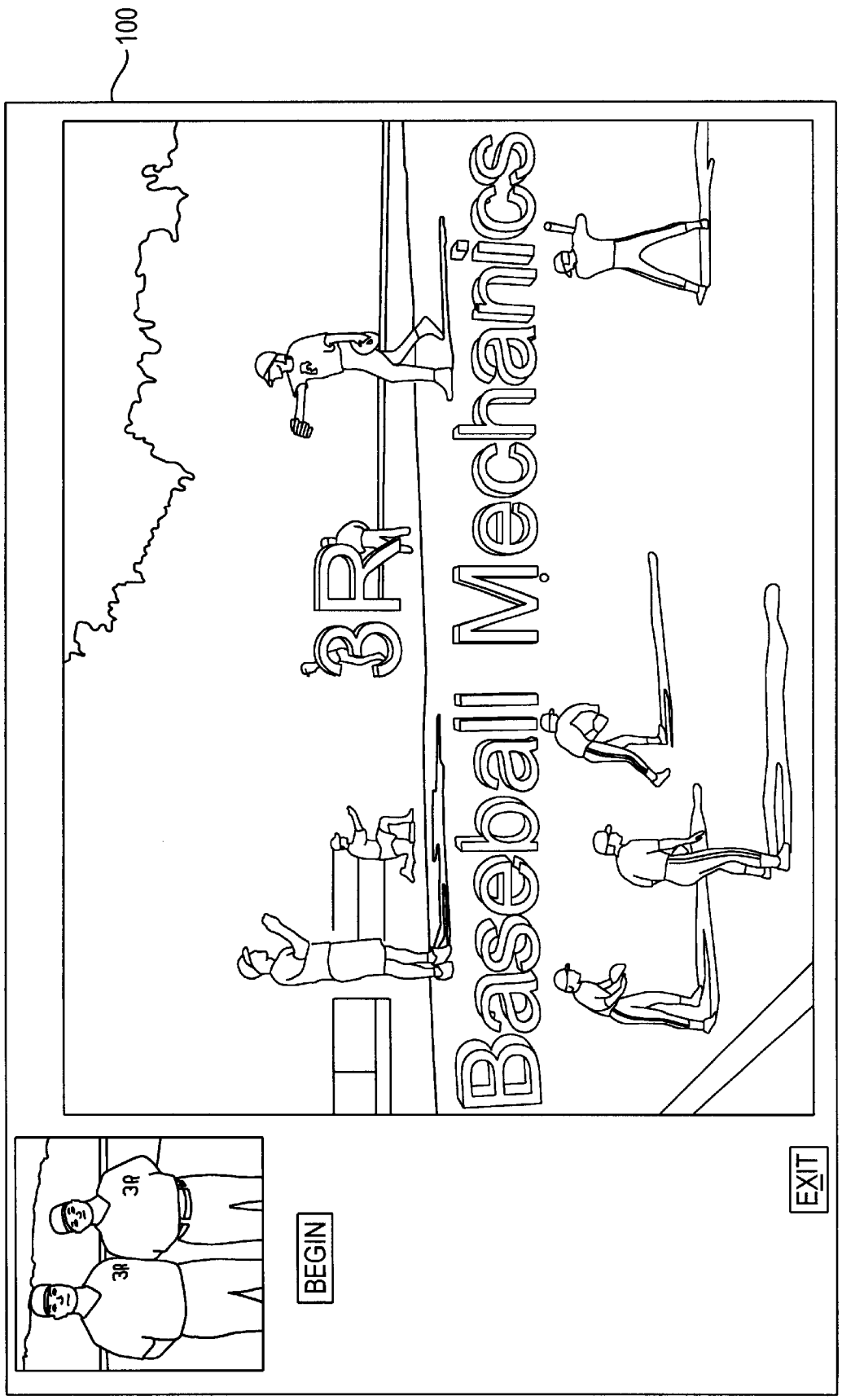
FIG. 1(a) is an illustrative introductory display screen in accordance with a preferred embodiment of the invention.

FIG. 1(a) shows an initial screen 100 which is displayed upon execution of the program on the computer. The screen 100 includes a combination of animated and human images warming up for a baseball game. A narration describes various feature of the application. A "begin" button is provided which allows a user to bypass the introductory narration and video. At the end of the introductory narration and video (or actuation of the begin button), FIG. 1(b) is displayed.

Figure 1B:
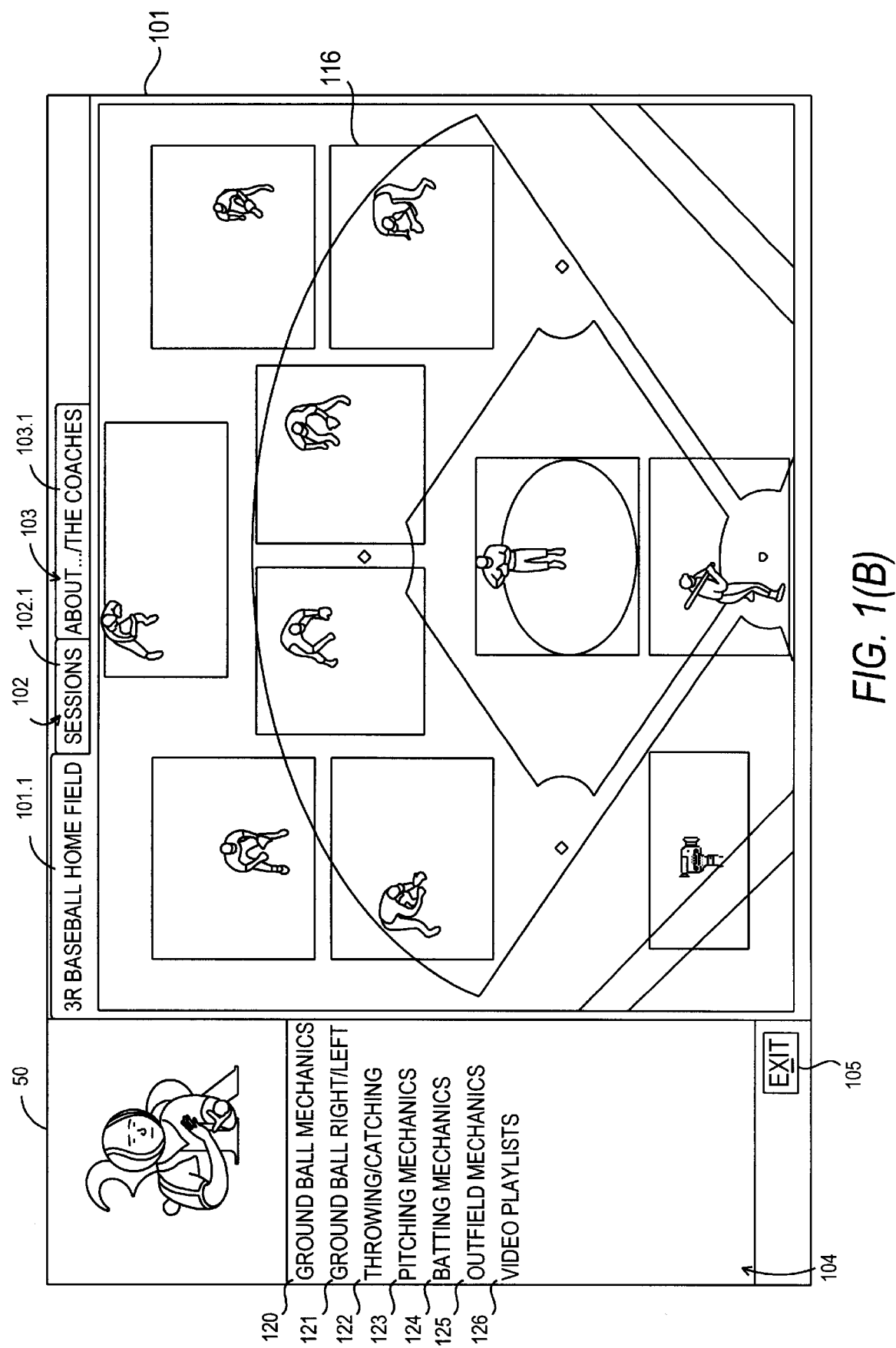
FIGS. 1(b, c, d) illustrates a baseball home field screen in accordance with the preferred embodiment of the invention, with the sessions screen and about screen hidden.
Figure 2:
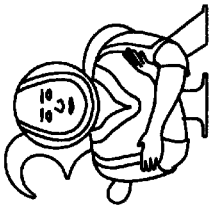
FIG. 2 illustrates an about screen for the embodiment of FIG. 1(a).

FIG. 1(b) illustrates a baseball home field screen 101, a sessions screen 102, and an about screen 103. In FIG. 1(b), the home field screen 101 is active, with sessions screen 102 and about screen 103 hidden, except for their respective tabs 102.1 and 103.1 Also shown in FIG. 1(b) is sidebar screen 104, which remains visible regardless of whether screen 101, 102, or 103 is active. In the upper left corner of sidebar screen 104 is an animated instructor 50. Preferably, the instructor is implemented as a Microsoft® software agent. FIG. 2 shows an illustrative about screen 103 which displays information relating to the coaches who provided the content of, and voices for, the instructional narration.

The animated instructor 50 serves to focus the viewer's attention on a specific detail. It guides the viewer through the material. It is a separate object that is part of the action and that binds the four separate panes into one perceived unit.

In any event, returning to FIG. 1(b), screen 101 includes players 110 through 118, which represent eight of nine possible baseball fielders and one baseball batter. When screen 101 is active, sidebar screen 104 displays a table of contents for the instruction sessions 102 contained in the program, including a ground ball mechanics session 120, ground ball right/left session 121, throwing/catching session 122, pitching mechanics session 123, batting mechanics session 124, outfield mechanics session 125, and video playlists session 126.

Each entry in the table of contents on sidebar screen 104, when actuated, will cause one or more of the animated players 110–118 to execute an appropriate baseball motion, and will cause a more detailed table of contents for the session corresponding to the actuated entry to be displayed. For example, when a user "clicks" on the entry 120 for the "Ground ball mechanics" with a computer mouse, players 113 and 116 execute the proper motion for fielding a ground ball, and a table of contents for the ground ball mechanics session is displayed. The same sequence occurs if a user "clicks" on one of the players 110–118. Entry 121 for "Ground ball Right/Left" is similarly linked to players 114 and 115, entry 122 for "throwing/catching" is similarly linked to player 111, entry 123 for "pitching mechanics" is similarly linked to player 117, entry 124 for "batting mechanics" is similarly linked to player 118, and entry 125 for "outfield mechanics" is similarly linked to players 110 and 112.

Figure 1C:
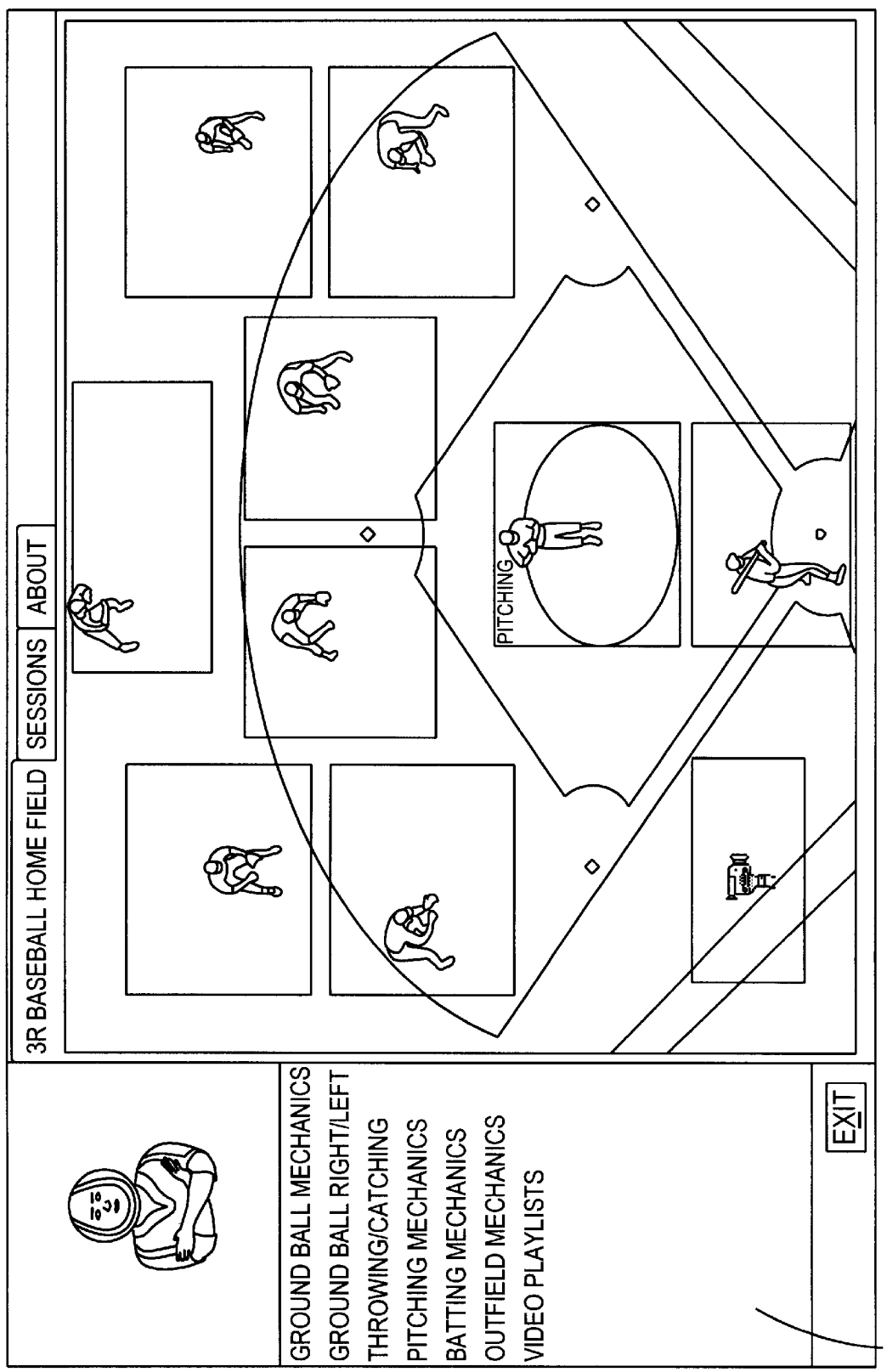
Figure 1D:
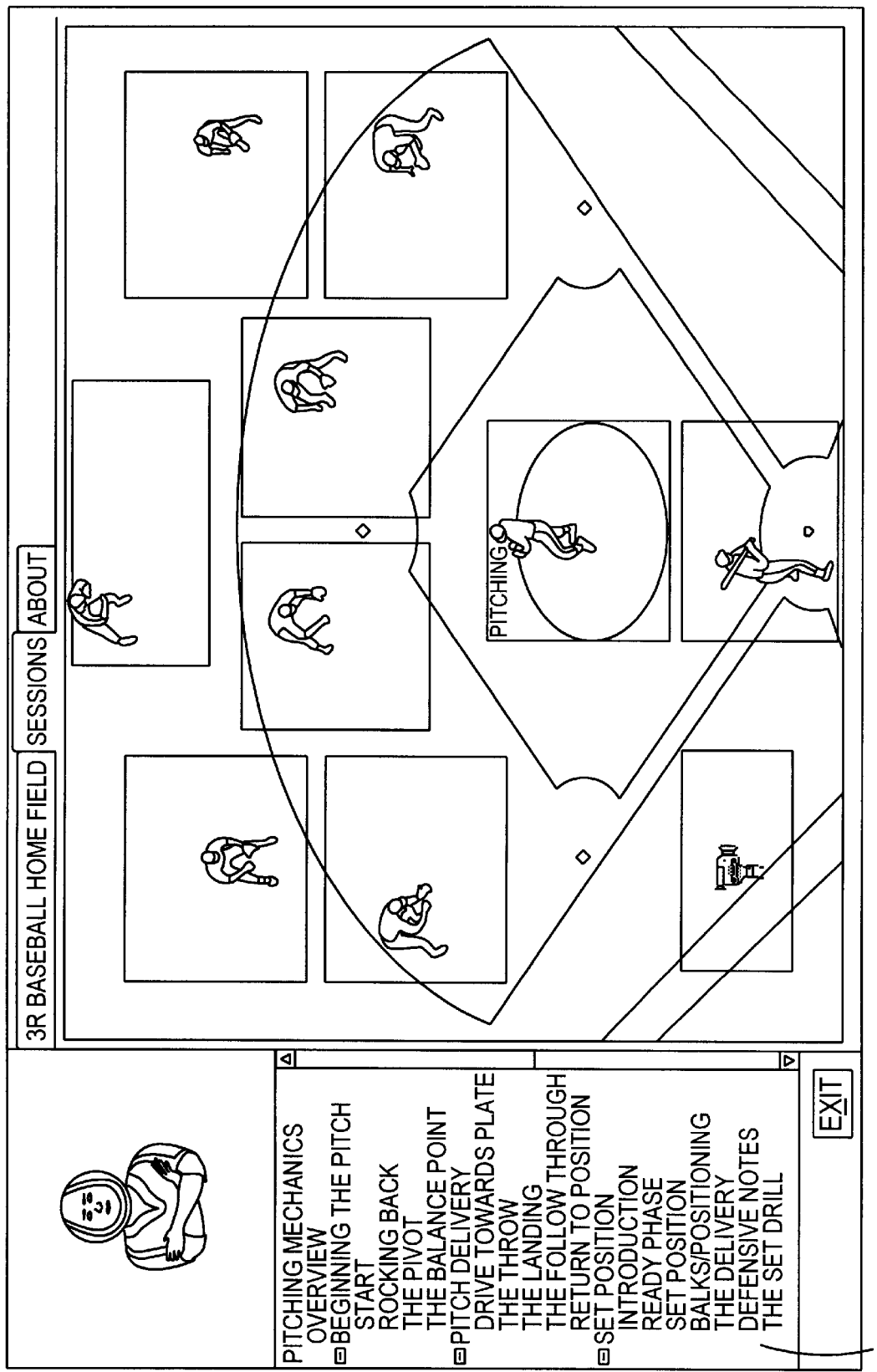

The above features can be illustrated with reference to FIGS. 1(c) and 1(d). As shown in FIG. 1(c), when the cursor passes over one of the players, the corresponding session name (in this case "pitching" for player 117) is displayed. When a user "click's on a player 117, the table of contents for the corresponding session (in this case, pitching mechanics) is displayed in the sidebar 104, the player 117 executes a pitching motion, as shown in FIG. 1(d), and the "sessions" tab 102.1 is activated to indicate that the pitching mechanics session will now be executed.

FIGS. 3–14 illustrate selected display screens for the pitching mechanics session 123. Similar types of display screens are provided for the ground ball mechanics session 120, ground ball right/left session 121, throwing/catching session 122, batting mechanics session 124, outfield mechanics session 125.

Figure 3:
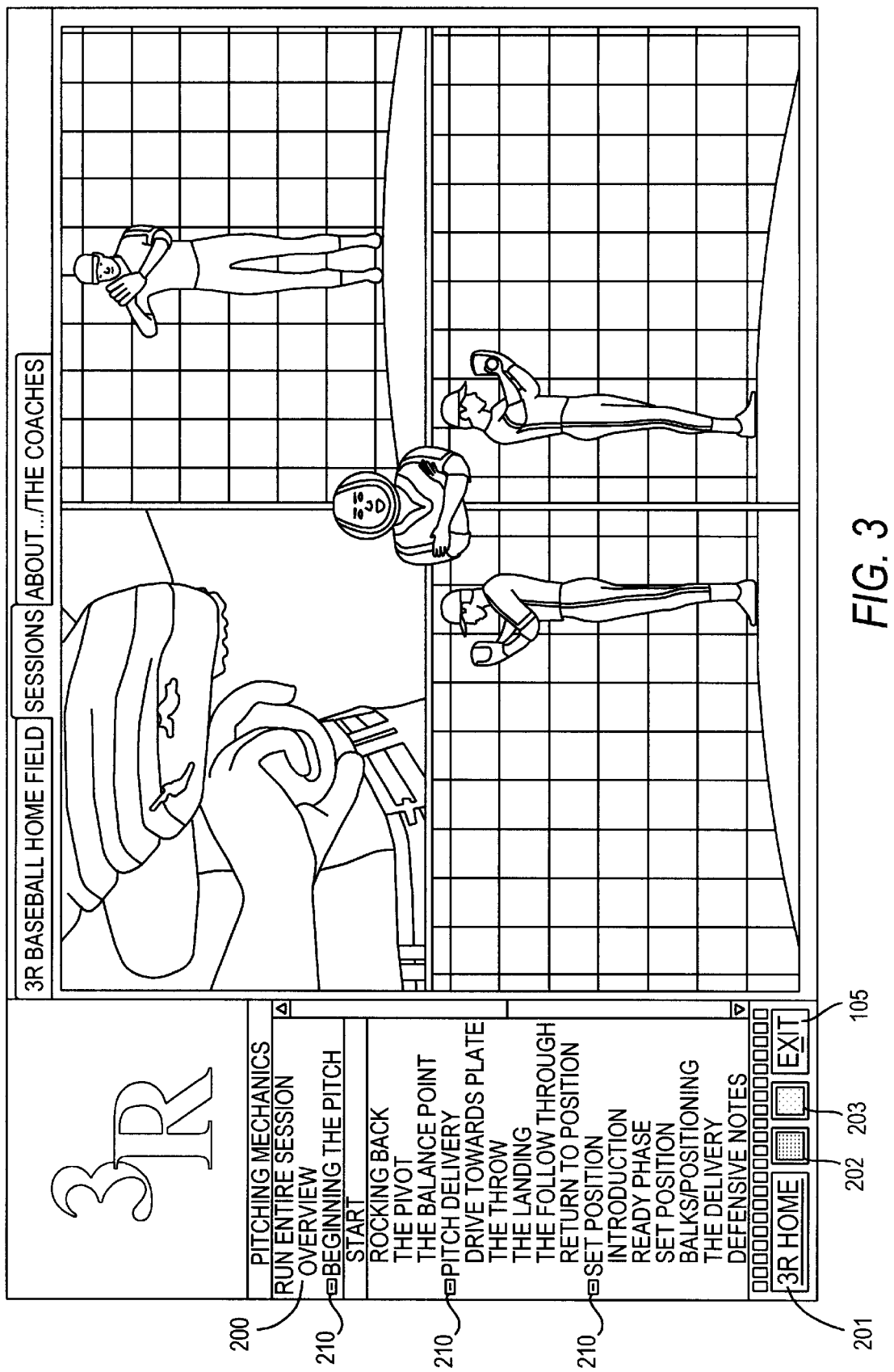
FIG. 3 is an illustrative display screen for a "start" motion segment of a beginning pitch sub-session of a pitching mechanics session in accordance with the preferred embodiment of the invention.

Referring to FIG. 3, when a session is executed, a table of contents 200 for the session is displayed in the sidebar 104. At the bottom of the sidebar 104 is a "3R Home" button 201, for returning to screen 101, a red colored "stop" button 202 for pausing the execution of the session, a green colored "go" button 203 for resuming execution of the session, and an exit button 105 for exiting the program. Each session is divided into a plurality of sub-sessions, and each sub-session is divided into a plurality body motions. For example, pitching mechanics session 123 includes 5 sub-sessions 210: i) beginning the pitch, ii) pitch delivery; iii) set position; iv) pitching drills; and v) pitching errors. Each sub-session, in turn, is divided into a plurality of motion segments. For example, the "beginning the pitch" sub-session includes the start, rocking back, pivot, and balance point motion segments; and the "pitch delivery" sub-section includes the drive towards the plate, throw, landing, follow through, and return to position motion segments.

Each motion segment is preferably displayed as a plurality of panes on a display screen, with each pane displaying either an animation or a real-life image of an individual performing the body motion for the motion segment. As the instructor 50 describes the proper body motions for the motion segment, the animated or real-life images in the panes execute the body motions described. During at least a portion of the motion segment, a first pane of the plurality of panes shows the animated or real-life image executing a body motion from a first vantage point; a second pane of the plurality of panes shows the animated or real-life image executing the body motion from a second vantage point, and a third pane of the plurality of panes shows the animated or real-life image executing the body motion from a third vantage point.

The animation of the animated images of the players are preferably implemented via motion capture using photo-realistic animation. The grid background in the figures is used to show the relative motion of the animated players, clarifying both their relative position and relative body angles. Preferably, the program is implemented as a number of separate objects, with the video implemented as compressed video objects and the audio implemented as compressed audio objects. The animated instructor is also implemented as a separate object, preferably using Microsoft® Agent software. The separation of the components into separate video, audio and agent objects and the use of compressed video and audio allows substantially more content to be included on a CD ROM as compared to the use of uncompressed video. For example, this architecture allows the inclusion of about 7 hours of instructional video and audio material on a single CD ROM (650 MB), as compared to about an hour of instructional video and audio with conventional techniques.

FIG. 3 is an illustrative display screen for the start motion segment of the beginning the pitch sub-session. In FIG. 3, the upper right pane shows an animated player at one instant during the start motion from a front vantage point; the lower right pane shows an animated player at the same instant from a right-side vantage point; the lower left pane shows the animated player at the same instant from a left-side vantage point, and the upper left pane shows a magnified view of the animated player removing the baseball from the glove at the end of the start motion.

Figure 4:
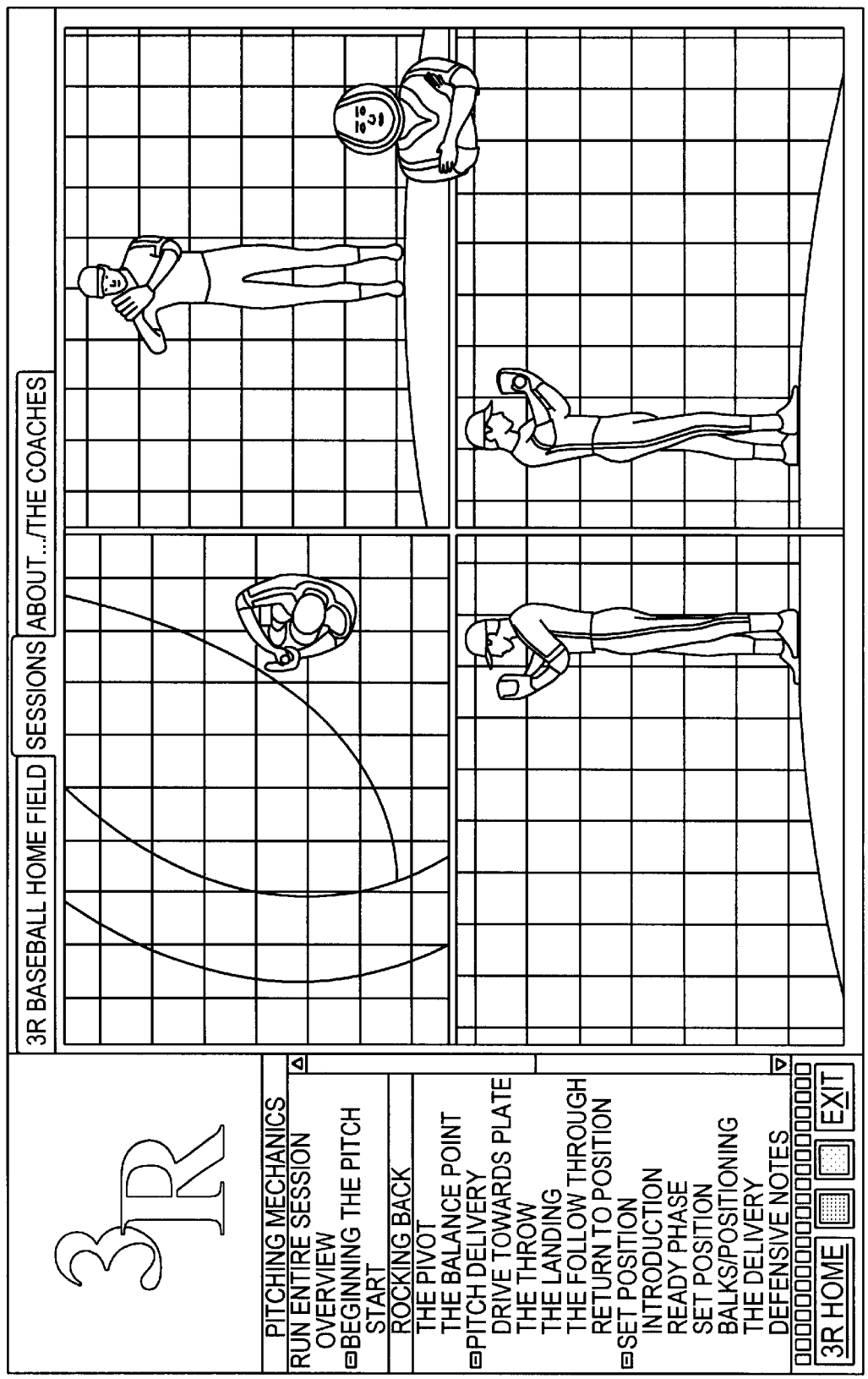
FIG. 4 is an illustrative display screen for a "rocking back" motion segment of a beginning pitch sub-session of a pitching mechanics session in accordance with the preferred embodiment of the invention.
Figure 5:
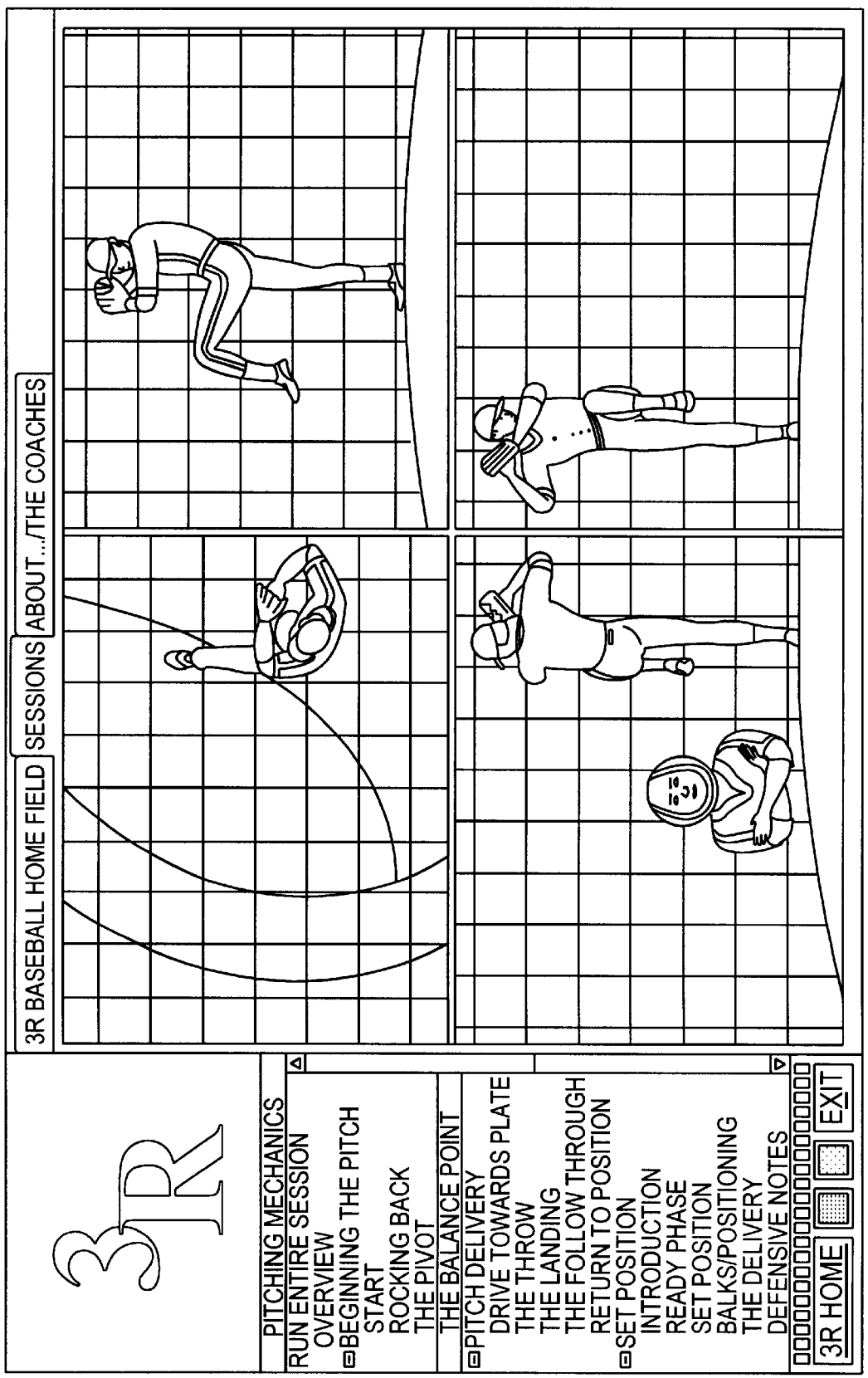
FIG. 5 is an illustrative display screen for a "balance point" motion segment of a beginning pitch sub-session of a pitching mechanics session in accordance with the preferred embodiment of the invention.

FIGS. 4 and 5 are illustrative display screens for the rocking back and balance point motion segments, respectively. In each case, the upper left pane shows the animated player at one instant during the respective motion segment from a top (or aerial) vantage point; the upper right pane shows an animated player at the same instant from a front vantage point; the lower right pane shows an animated player at the same instant from a right-side vantage point; and the lower left pane shows the animated player at the same instant from a left-side vantage point.

It should be noted that each of FIGS. 3, 4, and 5 is a single frame of a series of frames which comprise the moving picture of the start motion segment, the rocking back motion segment, and the balance point segment, respectively.

Figure 6A:
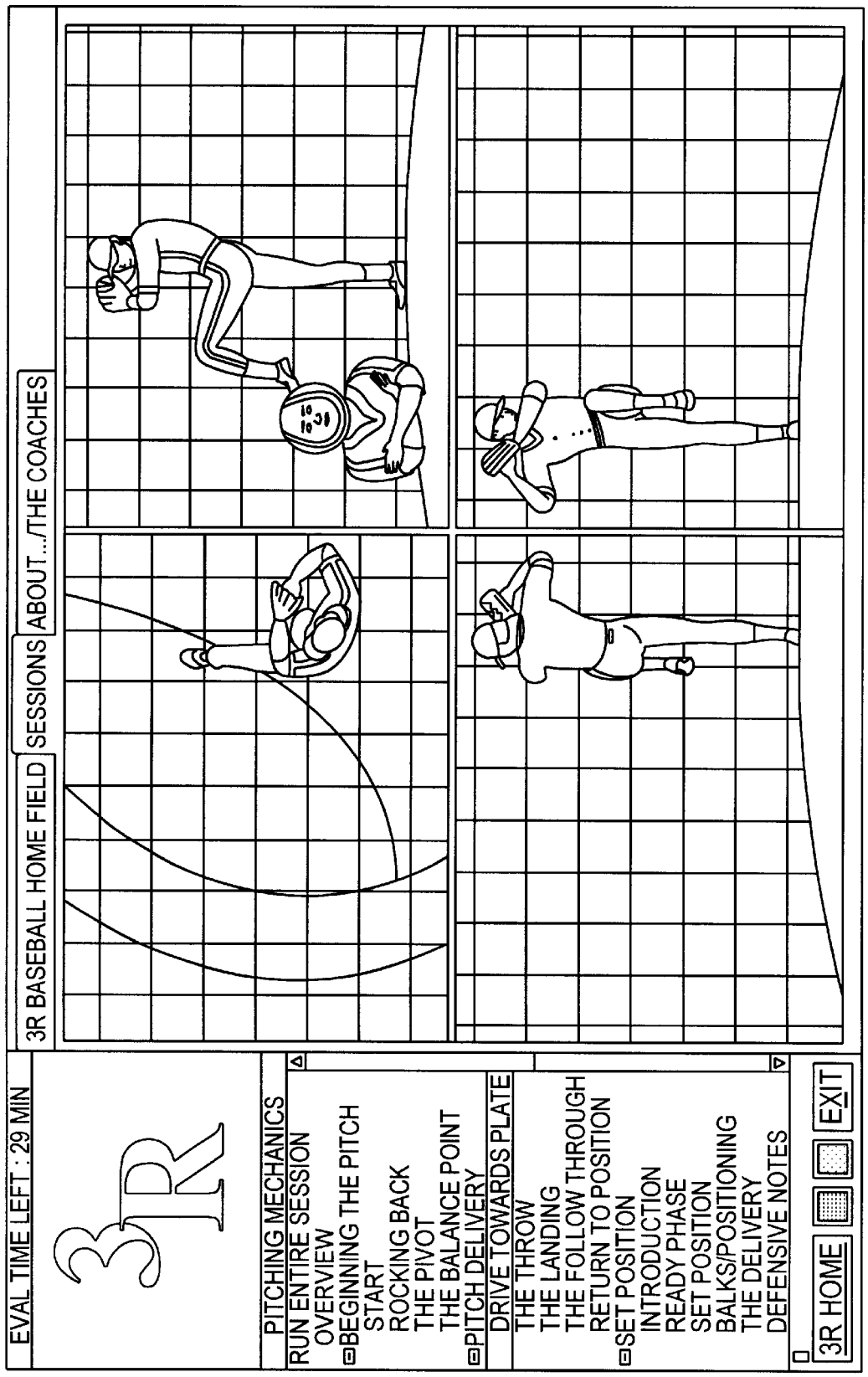
FIGS. 6(a–c) are illustrative display screens for a "drive toward the plate" motion segment" of the pitch delivery sub-session in accordance with the preferred embodiment of the invention.
Figure 6B:
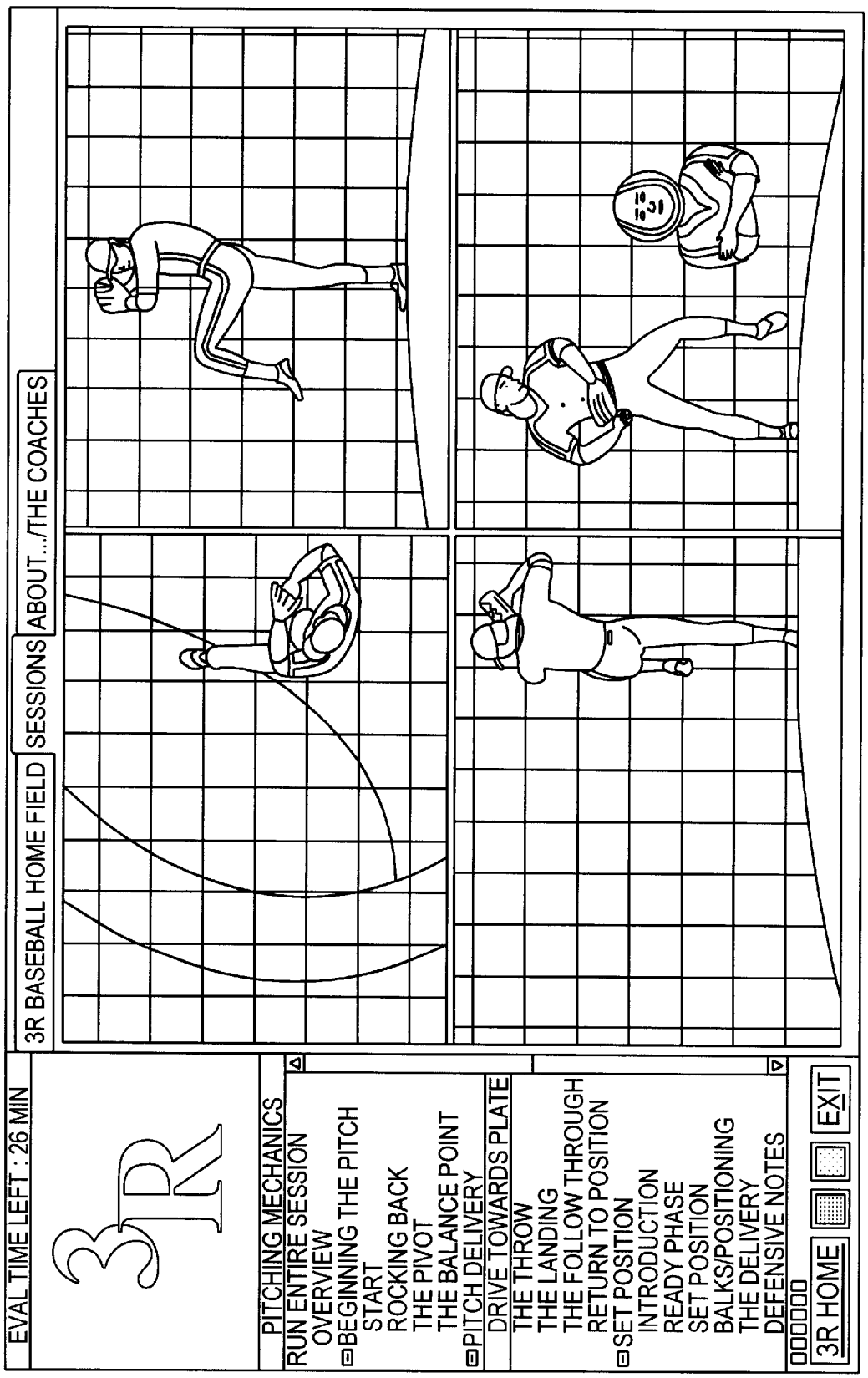
Figure 6C:
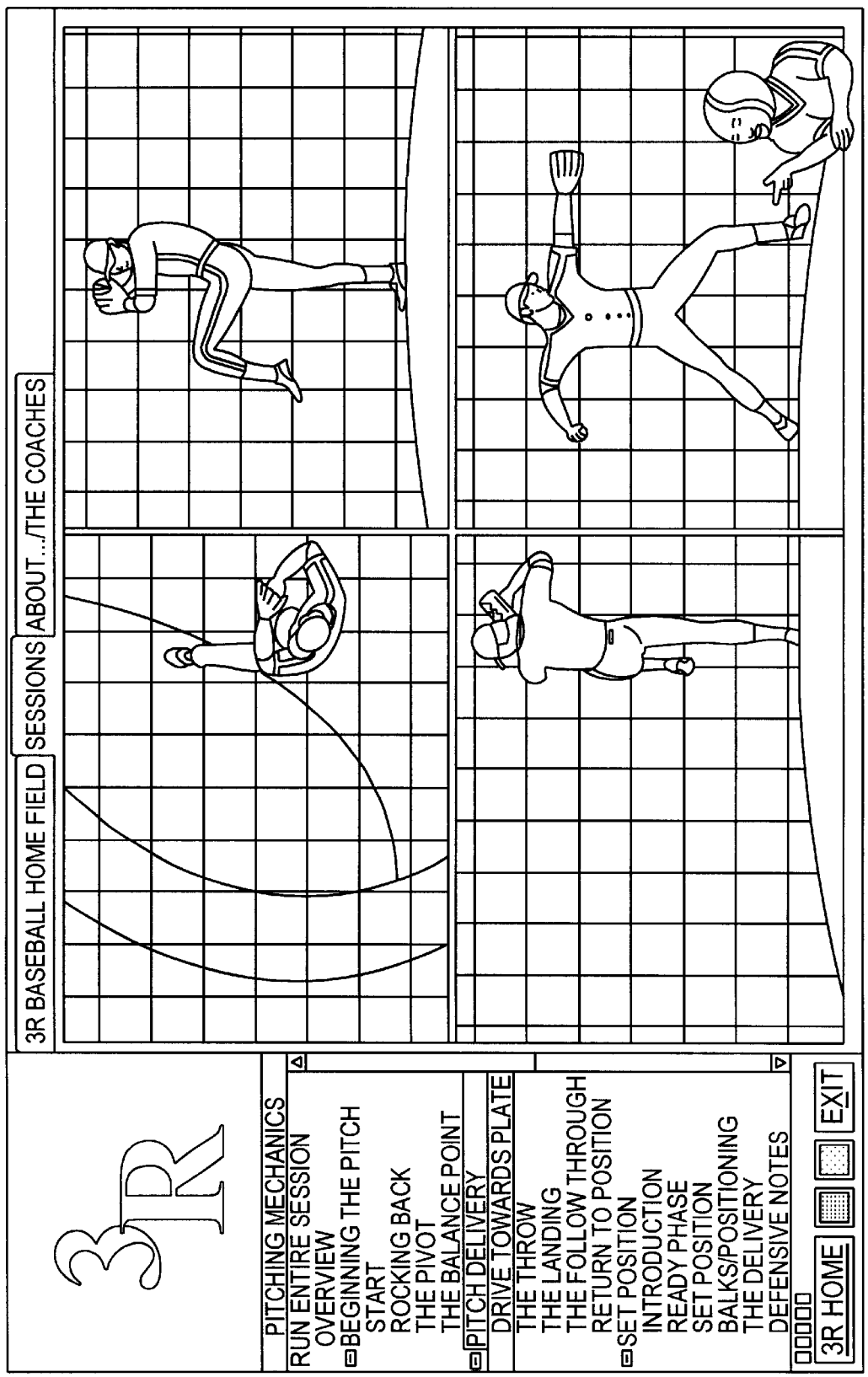

FIGS. 6(a–c) are illustrative display screens for the drive toward the plate motion segment of the pitch delivery sub-session. FIG. 6(a) is a screen display for a beginning portion of the drive toward the plate motion segment, with the upper left pane showing the animated player at one instant during the respective motion segment from a top (or aerial) vantage point; the upper right pane showing the animated player at the same instant from a front vantage point; the lower right pane showing the animated player at the same instant from a right-side vantage point; and the lower left pane showing the animated player at the same instant from a left-side vantage point. FIGS. 6(b) and 6(c) illustrate subsequent display screens for the drive toward the plate motion segment, in which the animated figure in the lower right pane moves in accordance with the drive towards the plate motion, while the remaining panes remain unchanged. In this manner, the user's attention can be focused on the movement of the animated player from a single vantage point as the movements are narrated by the instructor.

Figure 7:
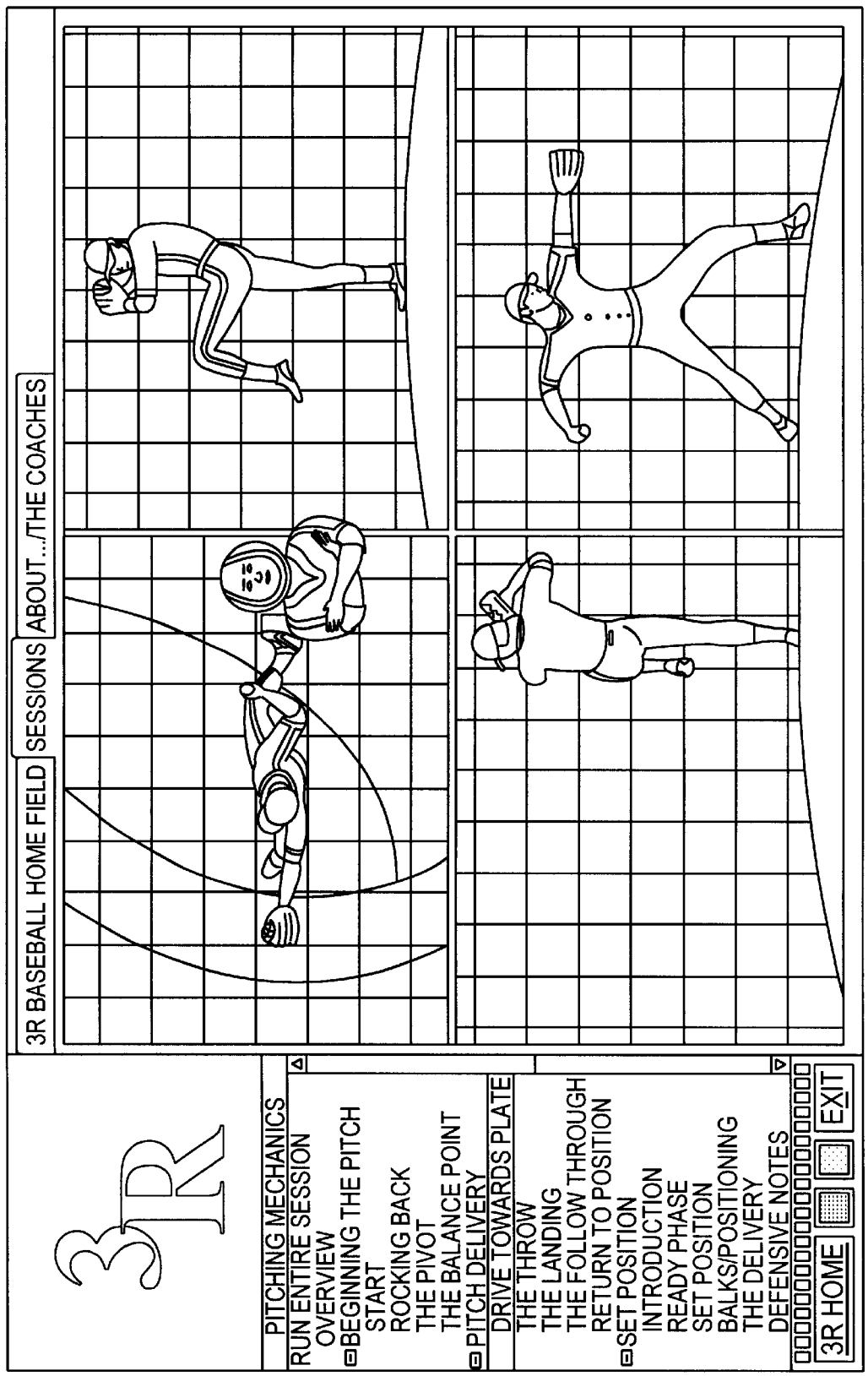
FIG. 7 is a subsequent illustrative display screens for the "drive toward the plate" motion segment" of FIGS. 6(a–c).

FIG. 7 shows a display screen, subsequent to FIG. 6(c), illustrating further movement of the animated player in accordance with the instructor's narration. In FIG. 7, the upper right and lower left panes still remain unchanged from FIGS. 6(a–c), while the upper left pane shows the animated player at one subsequent instant during the respective motion segment from a top (or aerial) vantage point and the lower right pane shows the animated player at that same instant from a right-side vantage point. Such a configuration is useful when the narration is focusing on a movement, in this case a particular segment of the throwing motion, which is best illustrated from the top and right vantage points.

Figure 8:
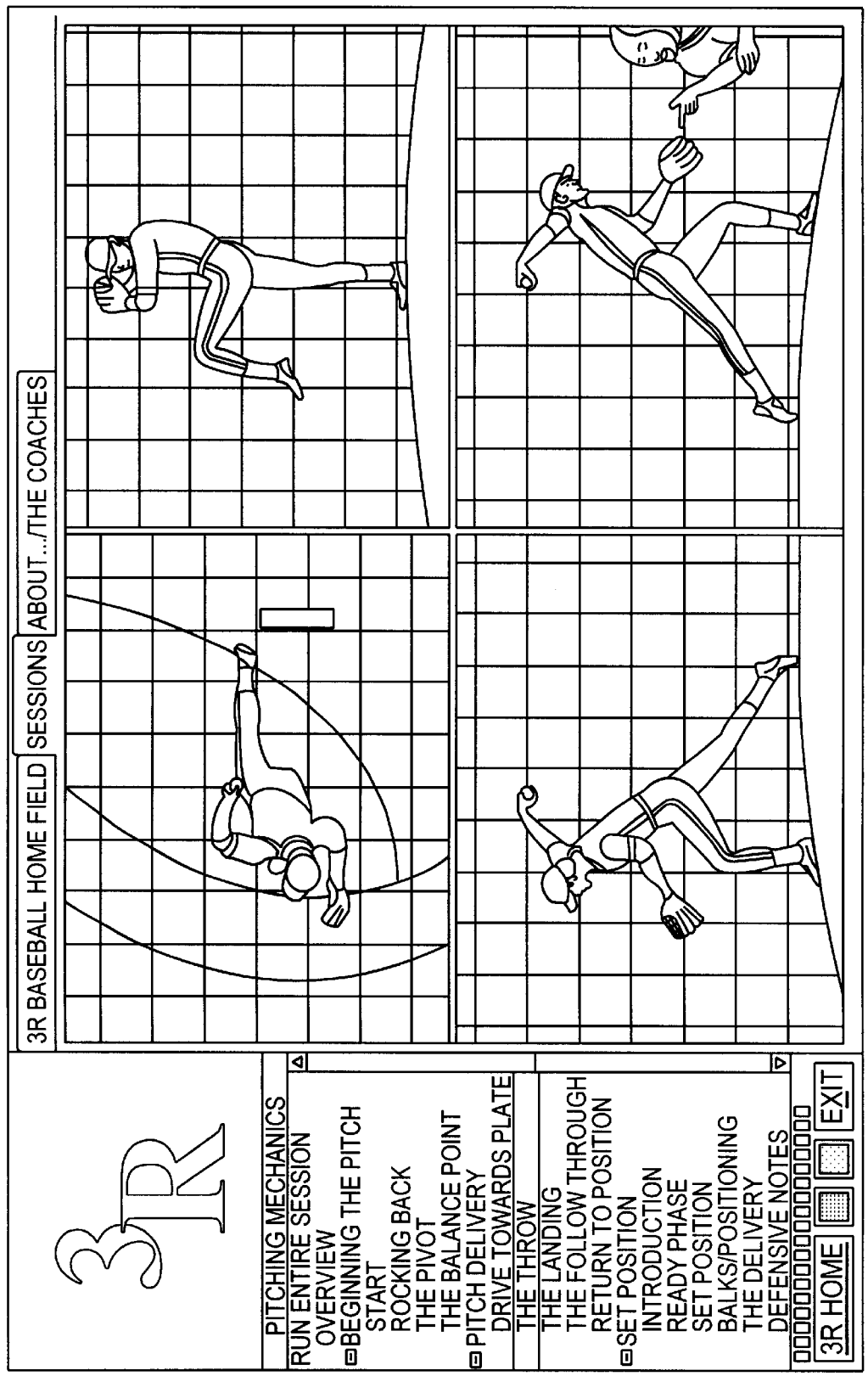
FIGS. 8 and 9 are illustrative display screens for a "throw" motion segment of the pitch delivery sub-session of a pitching mechanics session in accordance with the preferred embodiment of the invention.
Figure 9:
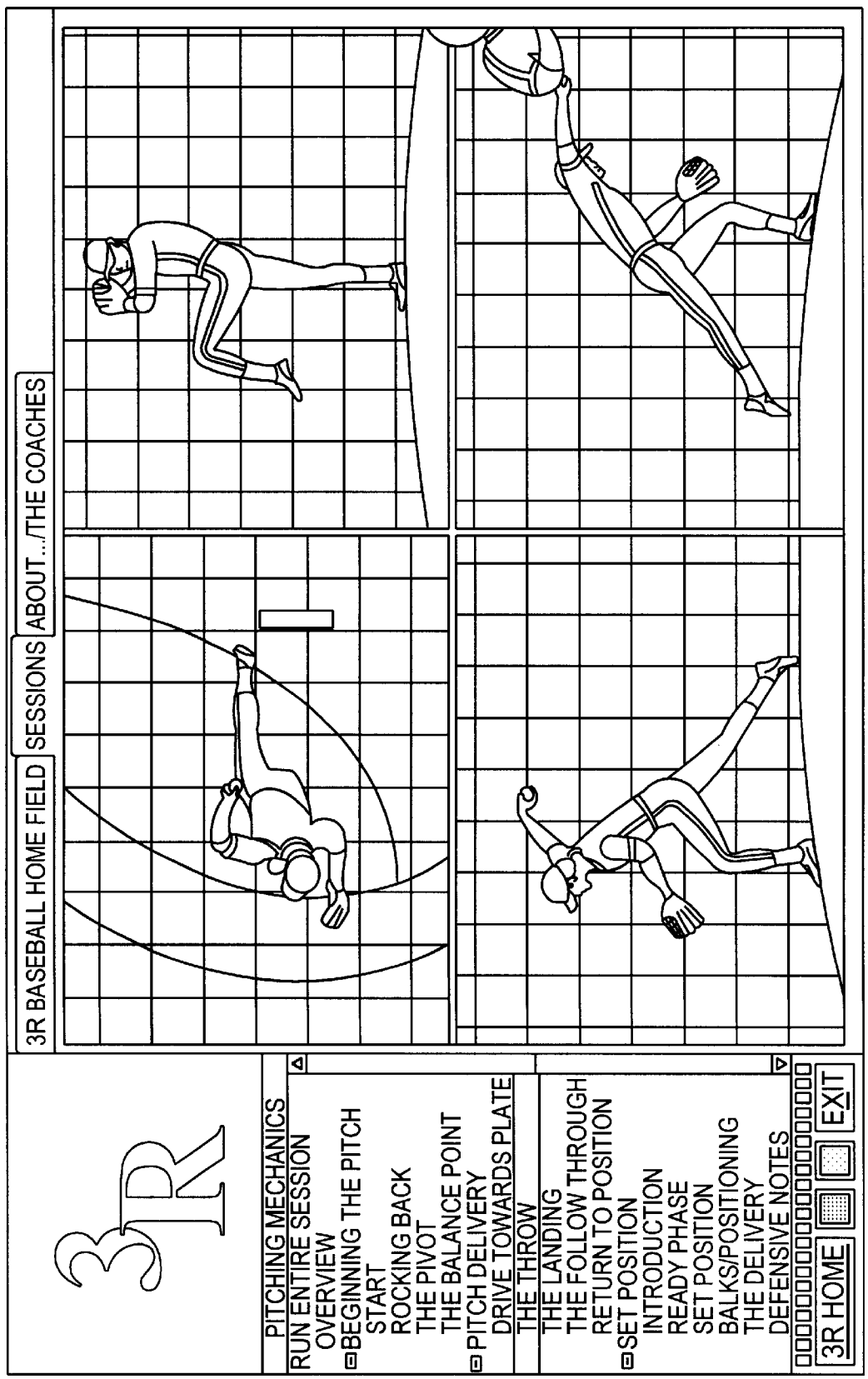
Figure 10:
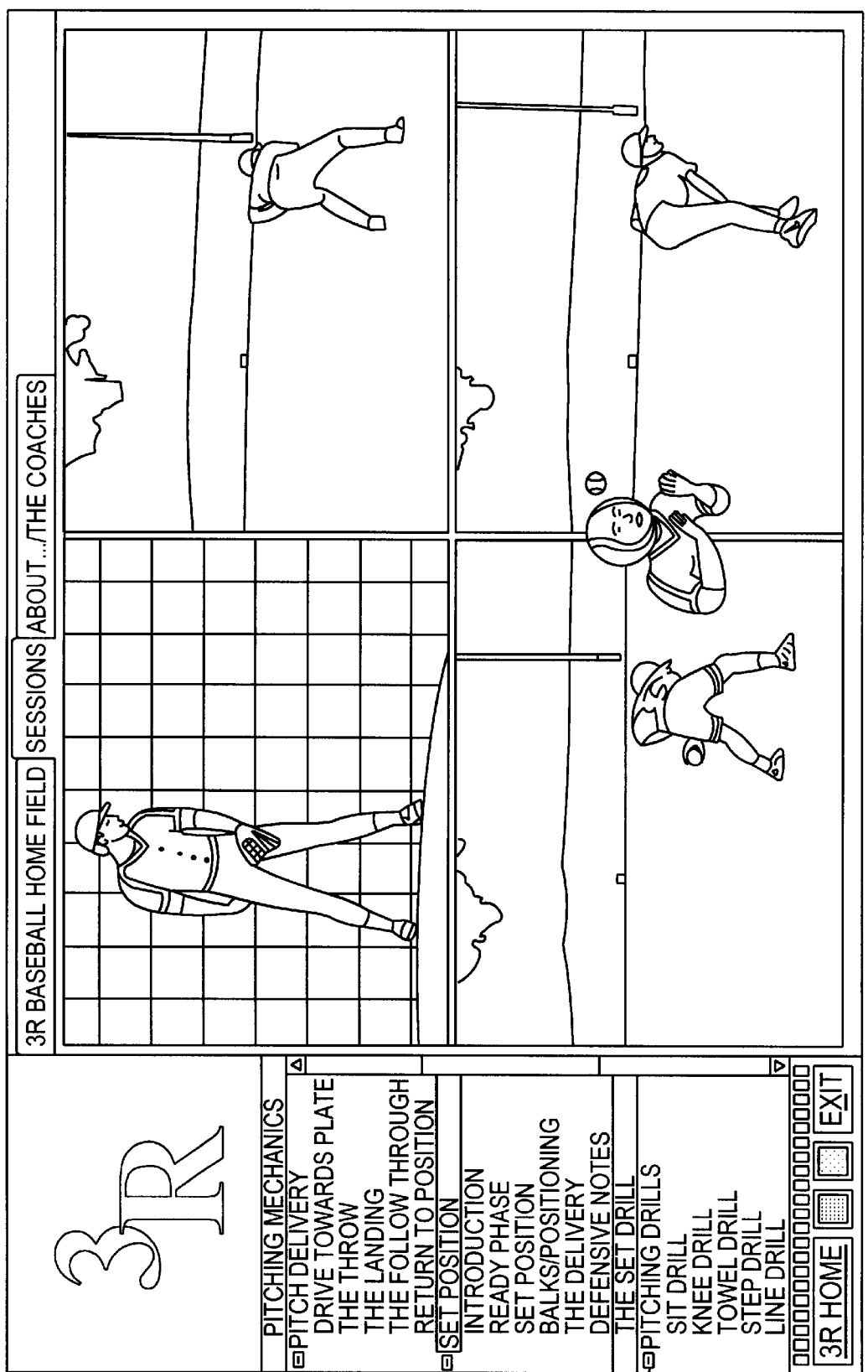
FIG. 10 is an illustrative display screen for a "set drill" motion segment of the set position sub-session of a pitching mechanics session in accordance with the preferred embodiment of the invention.

FIGS. 8 through 10 are illustrative screen displays from the throw motion segment of the pitch delivery sub-session. In FIG. 8, the upper right pane remains unchanged from FIGS. 6(a–c) and 7 of the prior sub-session, whereas the upper left pane shows the animated player at one instant during the throw motion segment from a top (or aerial) vantage point, the lower right pane shows the animated player at that same instant from a right-side vantage point, and the lower left pane shows the animated player at that same instant from a left-side vantage point. FIG. 9 is an illustrative screen display during a subsequent portion of the throw motion segment. In FIG. 9, the upper left, upper right, and lower left panes remain unchanged from FIG. 8, and the lower right pane moves in accordance with the pitching motion.

As shown in FIGS. 6(c) and 8, the instructor, during the motion segment, may point or gesture to the animated player as he narrates the movement.

FIG. 10 illustrates a set drill motion segment of the set position sub-session of the pitching mechanics session. In accordance with the set position sub-session, the proper form for a set position drill is illustrated with real-life images of human players executing the drill. Moreover, the same drill is illustrated by players of different ages, with the narration providing guidance as to how players of different ages should be instructed. In this regard, the upper right pane is a real-life image of a 16–18 year old player, the lower right pane is a real life video of a 12–14 year old player, and the lower left pane is a real life video of a 6–8 year old player.

As the coordination and skill level of a 17 year old is substantially greater than the coordination of a 12 year old, and the coordination and skill level of a 12 year old is substantially greater than the coordination of a 7 year old, it is important to tailor the instruction to the age of the player. At the same time, it is desirable to provide instruction to different age groups in a single product so that the product can continue to be used by the purchaser as the player grows older. Another advantage of providing a single product for multiple age groups is that a single product can be used by siblings of different ages.

Figure 11:
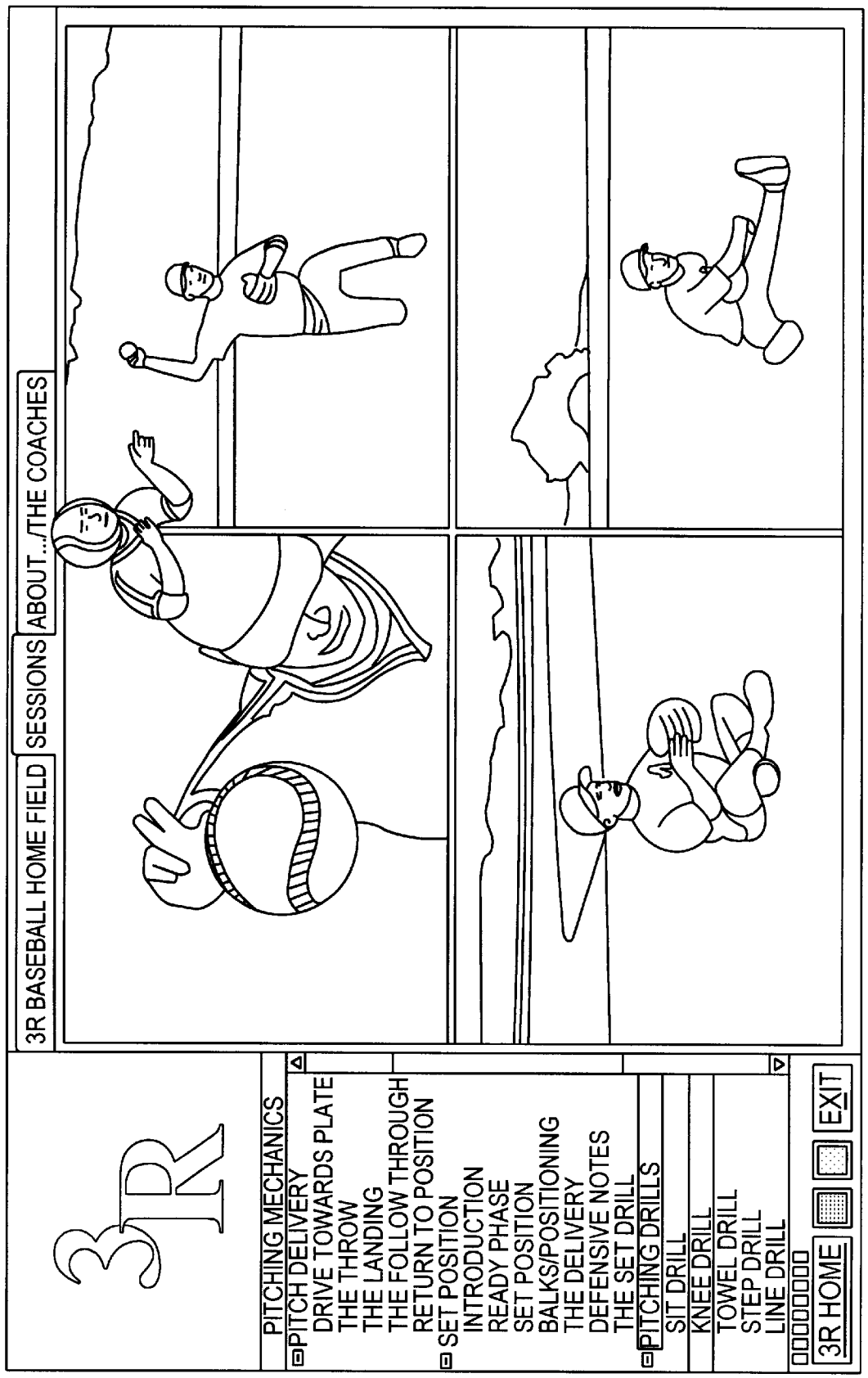
FIGS. 11 and 12 are illustrative display screens for a "knee drill" motion segment of the pitching drills sub-session of a pitching mechanics session in accordance with the preferred embodiment of the invention.
Figure 12:
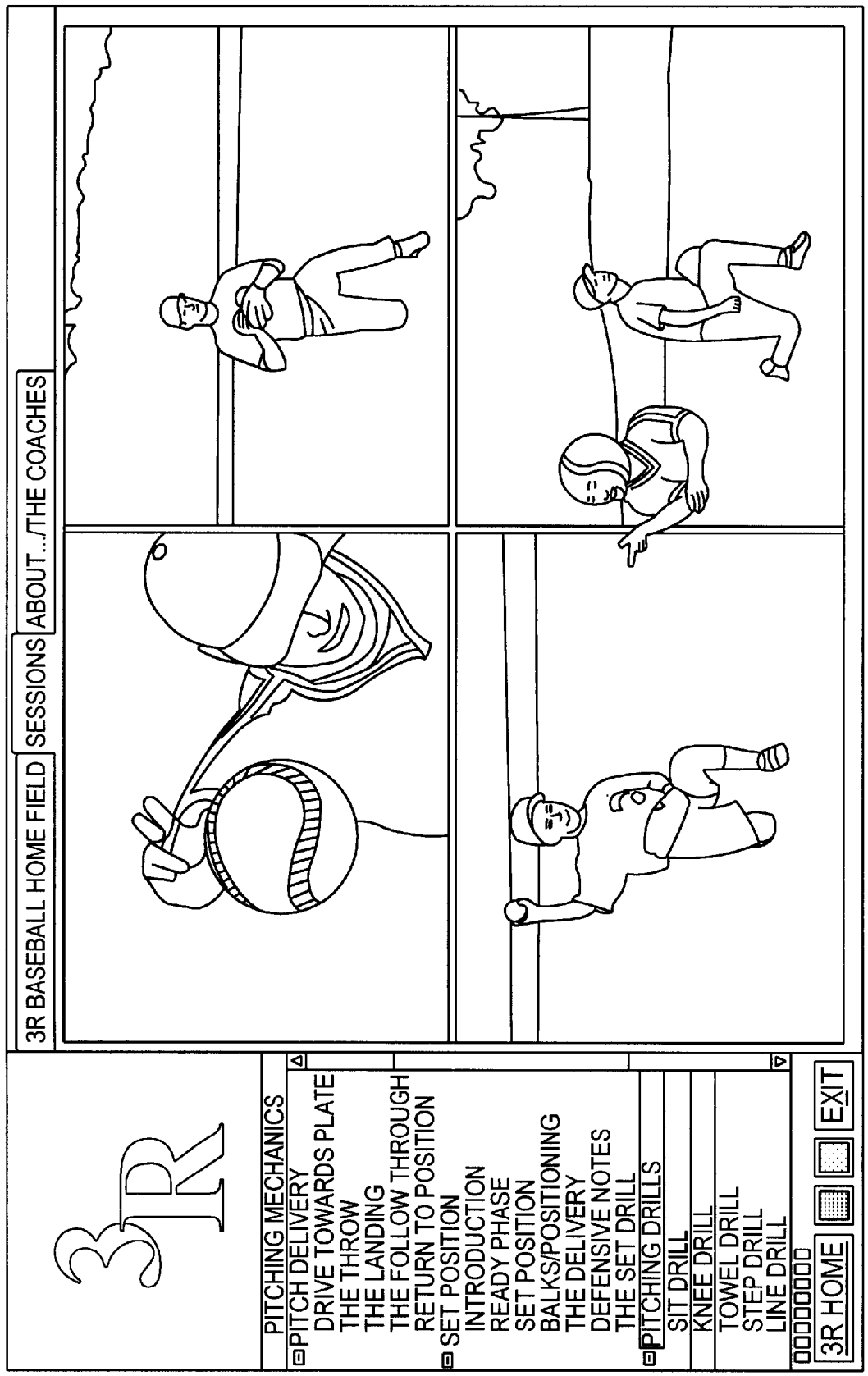

FIGS. 11 and 12 show a knee drill segment of a pitching drills sub-session of the pitching mechanics session. As in FIG. 10, the upper right pane is a real-life image of a 16–18 year old player, the lower right pane is a real life video of a 12–14 year old player, and the lower left pane is a real life video of a 6–8 year old player. In FIG. 11, the upper right pane shows a real life video of a 16–18 year old player performing the knee drill, as narrated by the animated instructor, who is shown gesturing towards the player. It should be noted that in FIG. 11, only the upper right pane is showing the knee drill motion, with the lower right, lower left and upper left panes still displaying the final frame from the prior segment (the sit drill segment). As the knee drill segment continues, the program sequentially displays the player in the lower right pane performing the knee drill, and then the player in the lower left pane performing the knee drill. In this regard, in FIG. 12, the lower left pane shows a real-life image of a 6–8 year old player performing the knee drill, as narrated by the animated instructor, who is again shown gesturing towards the player.

Figure 13:
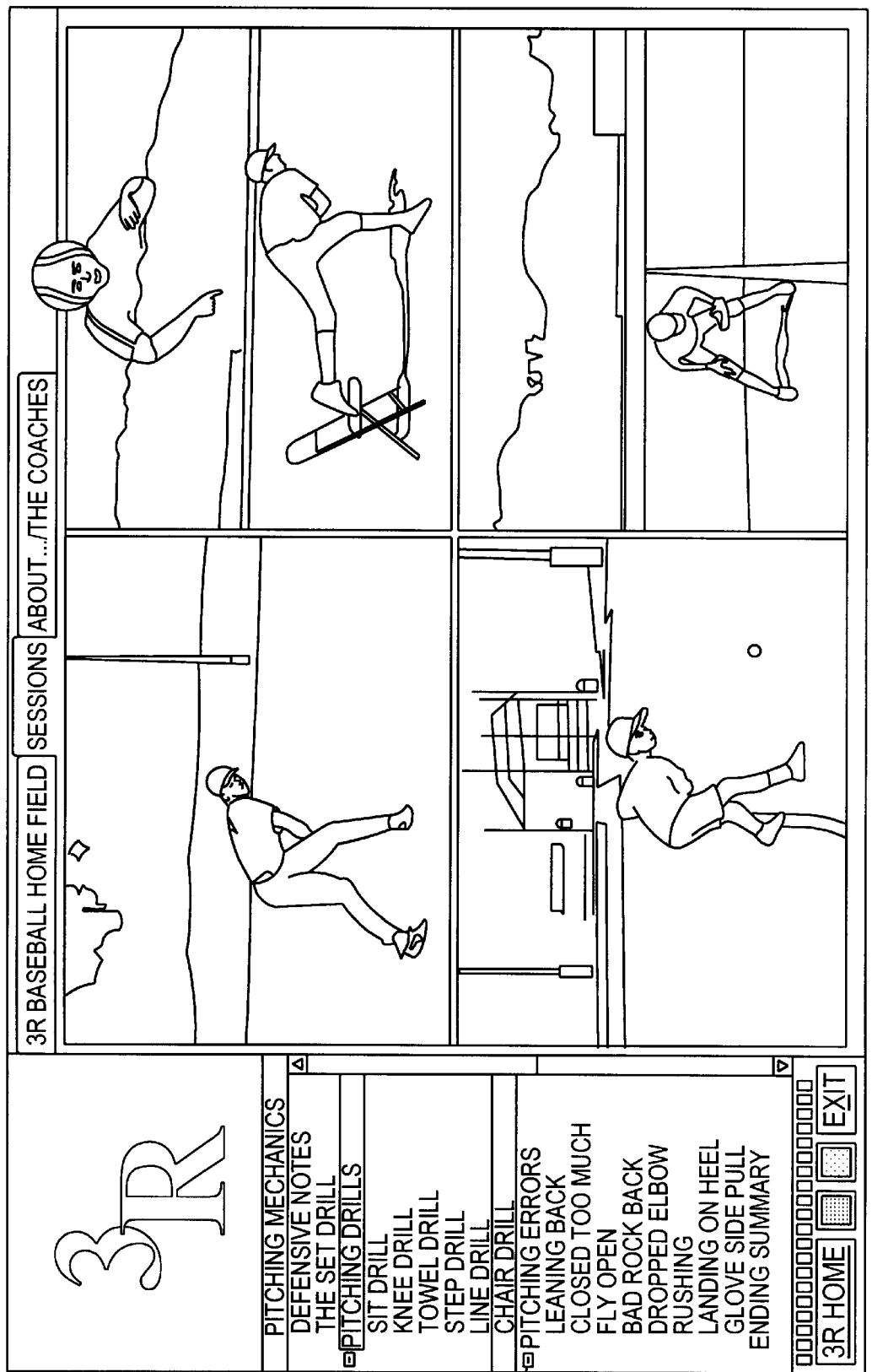
FIG. 13 is an illustrative display screen for a "chair drill" motion segment of the pitching drills sub-session of a pitching mechanics session in accordance with the preferred embodiment of the invention.

FIG. 13 shows a chair drill segment of a pitching drills sub-session of the pitching mechanics session. As in FIGS. 10–12, the upper right pane is a real-life image of a 16–18 year old player, the lower right pane is a real life video of a 12–14 year old player, and the lower left pane is a real life video of a 6–8 year old player. Similarly to FIG. 11, in FIG. 13, the upper right pane shows a real life video of a 12–14 year old player performing the drill (in this case, the chair drill), as narrated by the animated instructor, who is shown gesturing towards the player, with the remaining panes still showing the final frame of the previous segment (in this case, the line drill).

Figure 14:
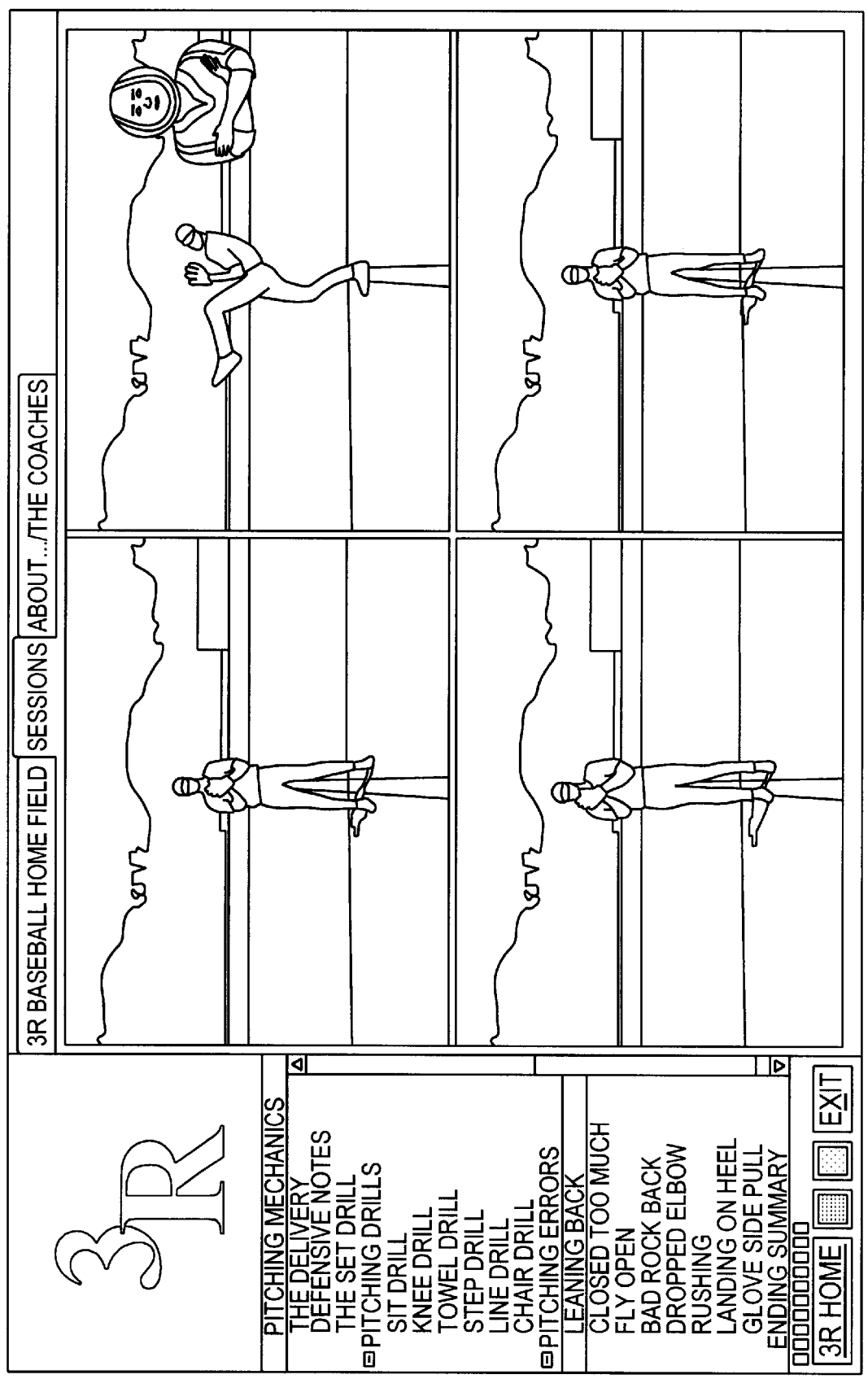
FIG. 14 is an illustrative display screen for a "leaning back" motion segment of the pitching errors sub-session of a pitching mechanics session in accordance with the preferred embodiment of the invention.

In addition to demonstrating the proper body motions for various skills, the system in accordance with the preferred embodiment of the present invention also demonstrates one or more incorrect body motions which are commonly made by players. In this regard, FIG. 14 shows a leaning back motion segment of a pitching errors sub-session of the pitching mechanics session. In FIG. 14, the upper right and lower left panes show a real-life image of a 16–18 year old player, and the upper left and lower right panes show a real-life image of a 12–14 year old player. As the player in the upper right pane proceeds to pitch with an incorrect motion, the animated instructor provides a narration pointing out the improper body motions, and explaining the detrimental effects of such a motion both in terms of game performance (in this case, poor ball motion, lost velocity, and poor fielding position) and in terms of possible injury.

Figure 15:
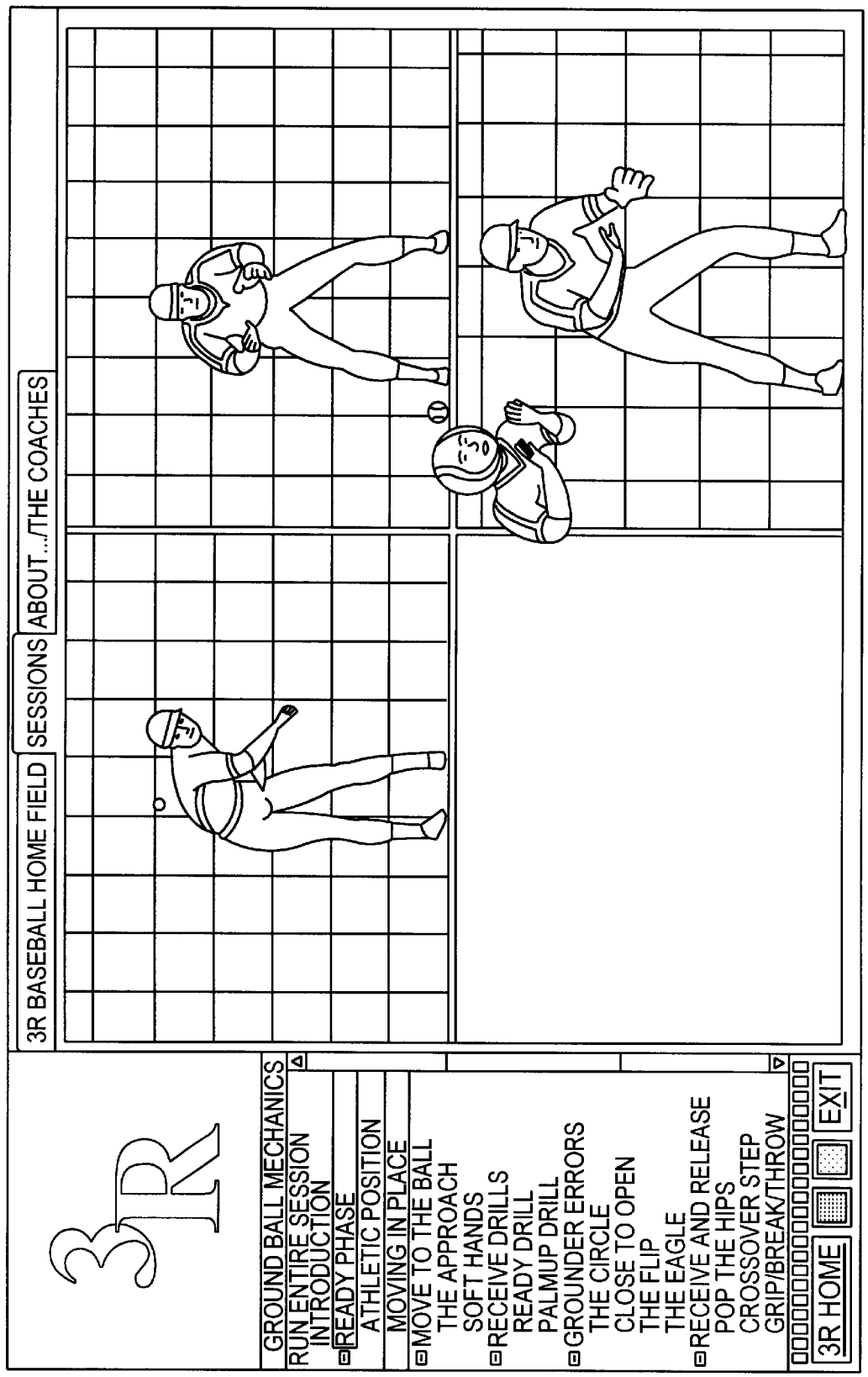
FIG. 15 is an illustrative display screen for a "moving in place" motion segment of the ready phase sub-session of a ground ball mechanics session in accordance with the preferred embodiment of the invention.
Figure 16:
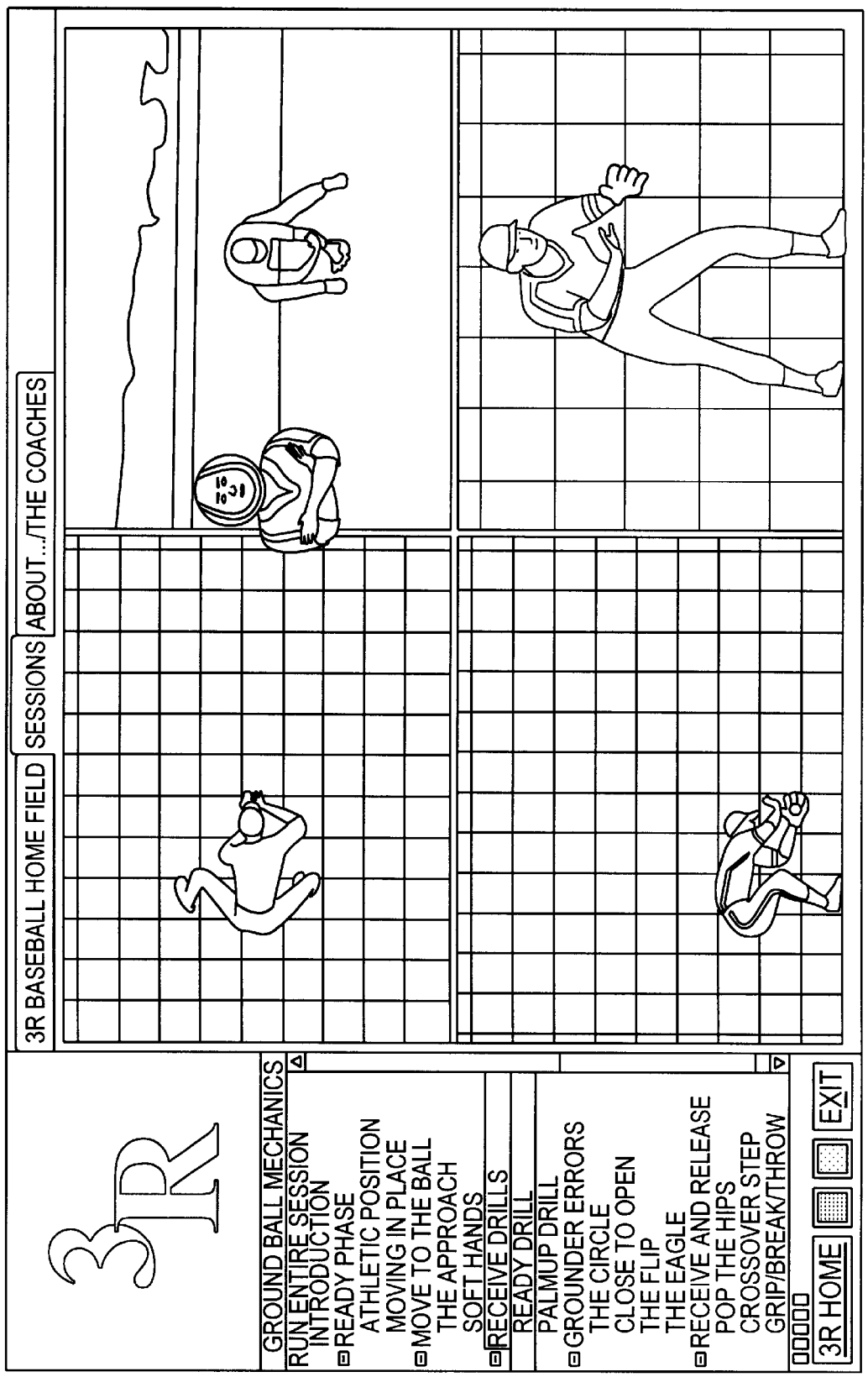
FIG. 16 is an illustrative display screen for a "ready drill" motion segment of the receive drills sub-session of a ground ball mechanics session in accordance with the preferred embodiment of the invention.

FIGS. 15 and 16 illustrate selected display screens for the ground ball mechanics session 120. Referring to FIG. 15, the ground ball mechanics session 120 includes includes 6 sub-sessions 210: i) ready phase, ii) move to the ball; iii) receive drills; iv) grounder errors; v) receive and release; and vi) more drills (not shown). As with the pitching mechanics session described above, each sub-session is divided into a plurality of motion segments. For example, the "ready phase" sub-session includes the athletic position and moving in place motion segments; and the move to the ball sub-session includes the approach and soft hands motion segments. For example, FIG. 15 show a display screen from the moving in place motion segment of the ready phase sub-session and FIG. 16 shows a display screen from the ready drill motion segment of the receive drills sub-session. FIG. 16 also illustrates that motion segments in accordance with the preferred embodiment of the present invention may include a combination of animated players and real-life images of players.

Figure 17:
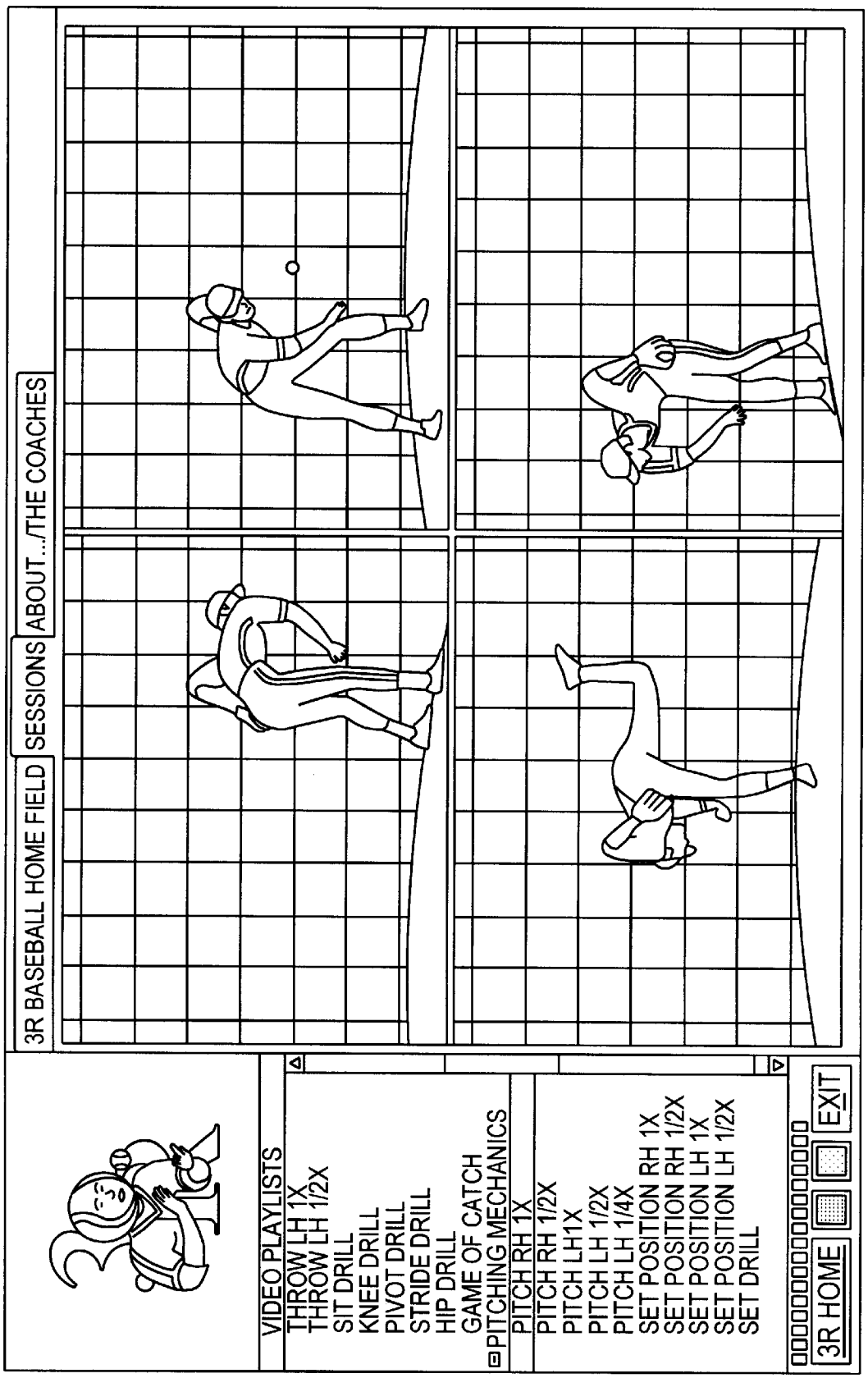
FIG. 17 is an illustrative display screen for a "Pitch RH 1x" motion segment of the video playlists session in accordance with the preferred embodiment of the invention.

FIG. 17 illustrates the video playlists 119 of the preferred embodiment of the present invention. As illustrated in FIG. 17, the video playlists session 119 includes 6 sub-sessions 210 which correspond to sessions 120 through 125. Specifically, the playlist session 119 includes the following sub-sessions: i) ground ball mechanics; ii) ground ball right/left; iii) throwing/catching, iv) pitching mechanics; v) batting mechanics; and vi) outfield mechanics. Each sub-session, in turn, is divided into video segments relating to its corresponding session (120–125). Preferably, the video segment do not contain any narration, and provide an uninterrupted video of the particular motion referenced.

For example, the "Pitch RH 1x" segment of FIG. 17 shows a full animated motion of a right handed pitcher pitching at full speed. Segment "Pitch RH ½x" shows the same motion as "Pitch RH 1x", but at half speed. In both cases, the pitching motion is shown sequentially from a front, right side, left side, back side, and aerial view. For example, in the frame shown in FIG. 17, the pitching motion is being shown from the back view (lower left pane). In prior frames, the pitching motion was shown from a right side view (upper left pane), front view (upper right pane), left side view (lower right pane). Subsequent to the frame shown in FIG. 17, the pitching motion will be shown from an aerial view in the upper left pane.

As set forth above, in accordance with another aspect of the present invention, a system and method is provided for marketing and selling software products. A preferred marketing and selling system in accordance with the present invention for marketing the instructional baseball program of FIGS. 1–17 will now be described with reference to FIG. 18.

The instruction software program of FIG. 1–17 is preferably marketed in the form of a CD ROM in conjunction with individual children's baseball organizations. In the United States, children's baseball leagues are generally run as non-profit organizations. These organizations may be dedicated sports organizations, such as baseball "Little Leagues" or as part of larger organizations such as religious institutions. In any event, these organizations frequently rely on fund-raising drives to pay for equipment and other operational needs. A Seller of the CD-ROM enters into a agreement with the children's sports leagues, whereby the sports leagues agree to offer the CD-ROM to the parents of its athletes, and the Seller agrees to donate a portion of the proceeds for any CD-ROM sold to the children's sports league.

The CD-ROM product is offered to parents by the children's sports leagues during their fund-raising initiatives and during player registration days. The parents are informed that the CD ROM product, which provides instruction for the children's baseball, the very sport that the parent has enrolled (or is considering enrolling) his or her child in, can be used for free during a trial period. The parents are also informed that if they choose to purchase the CD ROM at any point during or after the trial period, a portion of the sales price will be donated to the sports league.

Once distributed, the software product is freely useable during a trial period by the parents, their children, or any person in possession of the product. The trial period could be defined in a number of ways. For example, the trial period could expire on a date certain from the manufacture date of the product, on a date certain after the first use of the product, after a total specified time period of use (e.g. 2 hours) regardless of how many times the program is used (e.g., opened and closed); after a specified number of uses of the product; or a combination of the foregoing. Upon expiration of the trial period, encryption technology prevents further use of the product until a purchase is made.

Figure 18:
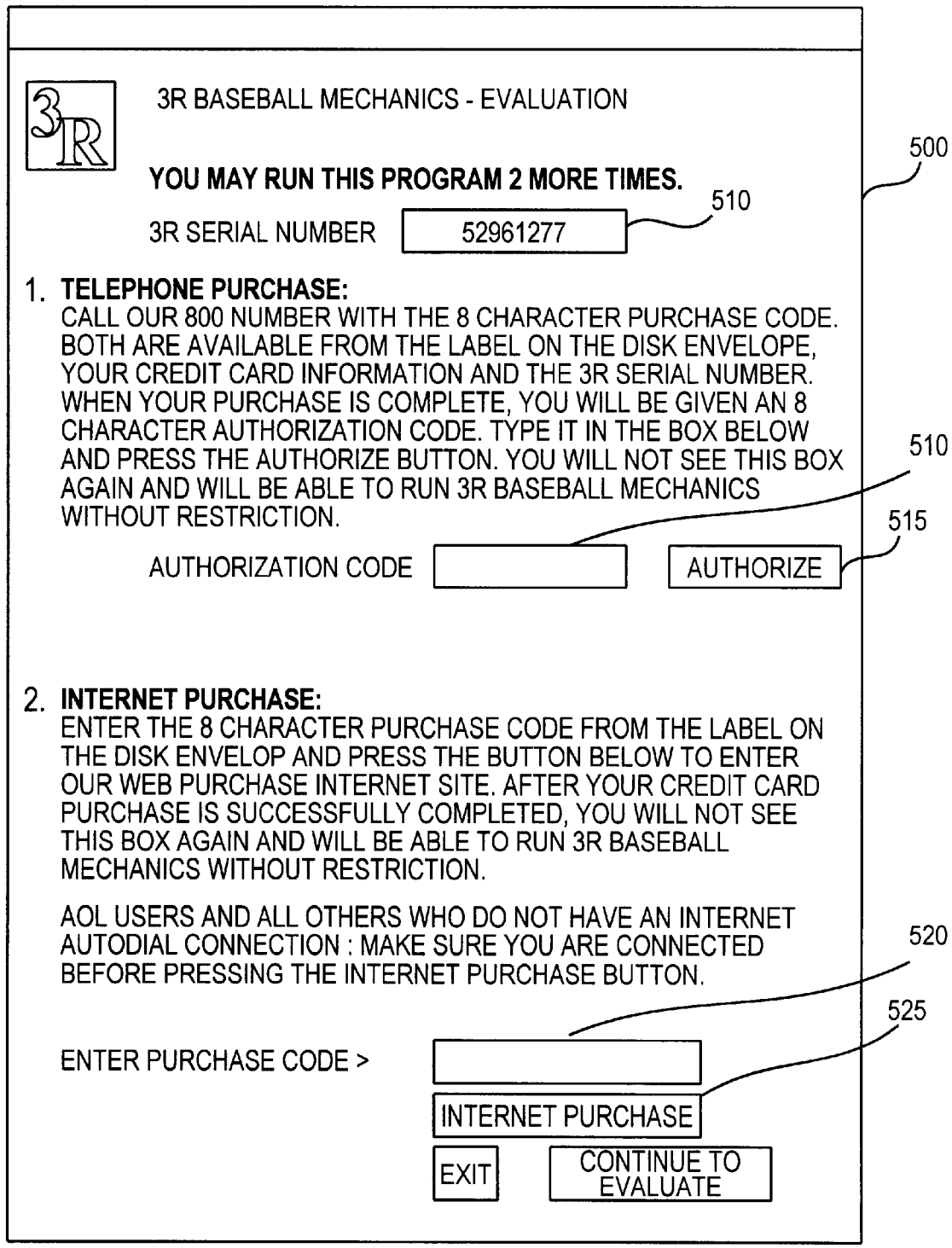
FIG. 18 shows purchase/evaluation display screen in accordance with a preferred embodiment of the invention.

Referring to FIG. 18, each time that the program is initiated, a product evaluation/purchase screen 500 is displayed. In the embodiment of FIG. 18, the trial period has been set to expire after the program is opened and closed twice, with a thirty minute time limit for each of the two uses.

The screen 500 includes a randomly generated product serial number for the CD ROM. This number will be different each time the program is entered during the evaluation period. In addition, a purchase code is printed on the product packaging or on the product itself.

The user can purchase the program in two ways: via telephone or via the Internet. To purchase the program by telephone, the user calls a toll-free telephone number and provides the seller with the necessary credit card payment information, the serial number 510, and a purchase code which is printed on the label of the CD ROM. Once the seller has completed the credit card sale, the user is given a multi-character authorization code. The user then enters the code in the authorization code field 510 and presses the authorize button 515. If the authorization code is correct, the user (or anyone else) is free to use the program without further restriction. The serial number used for the purchase is then stored as the permanent serial number for the product.

The purchase code is used by the seller to identify the sponsoring sports organization, and may also be used to determine the amount of the donation to be paid to the sponsoring organization (e.g. $5 for the first 50 units, and $3 thereafter for organization A; and $6 for the first 75 units, and $4 thereafter for organization B).

To purchase the program over the Internet, the user enters the purchase code in field 520, presses the Internet purchase button 525, and provides the seller with the required credit card information over the Internet. The seller obtains the serial number and purchase code electronically and completes the credit card transaction. An electronic authorization is then transmitted electronically to the program over the Internet, and the user (and anyone else) is allowed to use the program without further restriction. As set forth above, the system in accordance with the present invention is applicable to a wide variety of human physical endeavors, including, for example, baseball, basketball, golf, tennis, weight training, aerobics, and physical therapy. As an illustration, FIG. 19 shows an illustrative display screen for a golf instruction embodiment in accordance with the present invention and FIG. 20 shows an illustrative display screen for a basketball instruction embodiment in accordance with the present invention.

Figure 19:
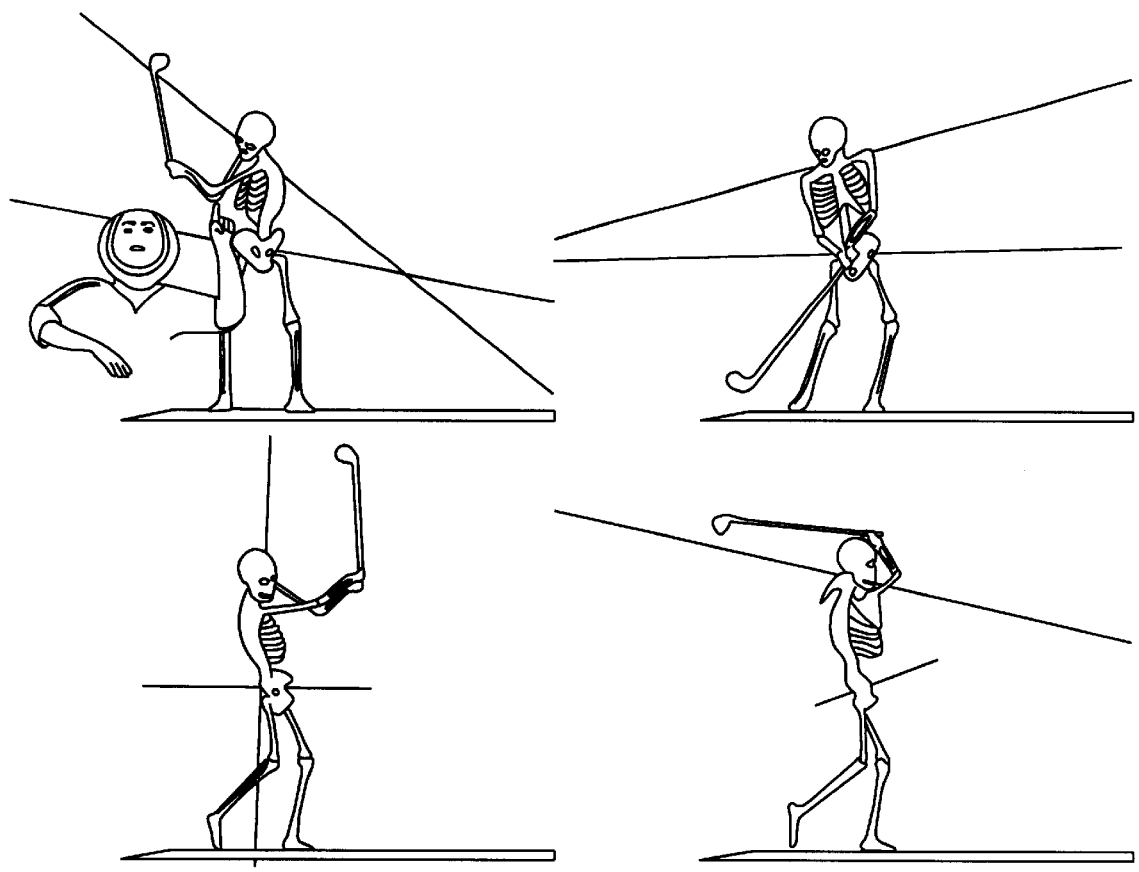
FIG. 19 is an illustrative display screen for a golf instruction embodiment in accordance with the present invention.

FIG. 19 shows a four pane display for an illustrative golf instruction embodiment in accordance with the present invention, including an animated instructor who narrates the proper movement for a particular golf skill. In accordance with this embodiment, golf instruction is divided into 18 teaching sub-sessions: 1) Grip; 2) Aim; 3) Address Position and Posture (foundation); 4) Foot Position; 5) Ball Position; 6) Posture; 7) Start of the Swing; 8) Swing Plane and Path; 9) Weight Transfer and Coiling; 10) Change of Direction and Transition; 11) Impact or Delivery Position; 12) Finish and Balance; 13) Putting; 14) Pre-Shot Routine; 15) Drills; 16) Mental Imaging; 17) Special Shots and Circumstances; 18) Ball Flight Laws. Each sub-session, in turn, could include a plurality of motion segments. For example, address position and Posture might include: a) Shoulder width stance; b) Slight flex in the knees; c) Bending from the hips; d) Arms hanging naturally; e) Sunken wrist position; f) Spine Angle; g) K Set-up; and h) Tension. The putting sub-session, in contrast might include a) Set-up; b) Posture and Spine Position; c) Pendulum Style; d) Grip(s); e) Ball Position; and f) Reading Greens. As a final example, the start of the swing sub-session might include: a) Waggle; b) Weight Distribution and Where; c) One-Piece start (coordinated movement); d) Club rotation; e) On-Plane position; and f) Shoulder and Hip Rotation. The animated instructor interacts with the images in the various panes of the display in the same manner as was described above with regard to FIGS. 1–18. As with the embodiment of FIGS. 1–18, the golf instruction embodiment may utilize real-life, as well as animated, images.

Figure 20:
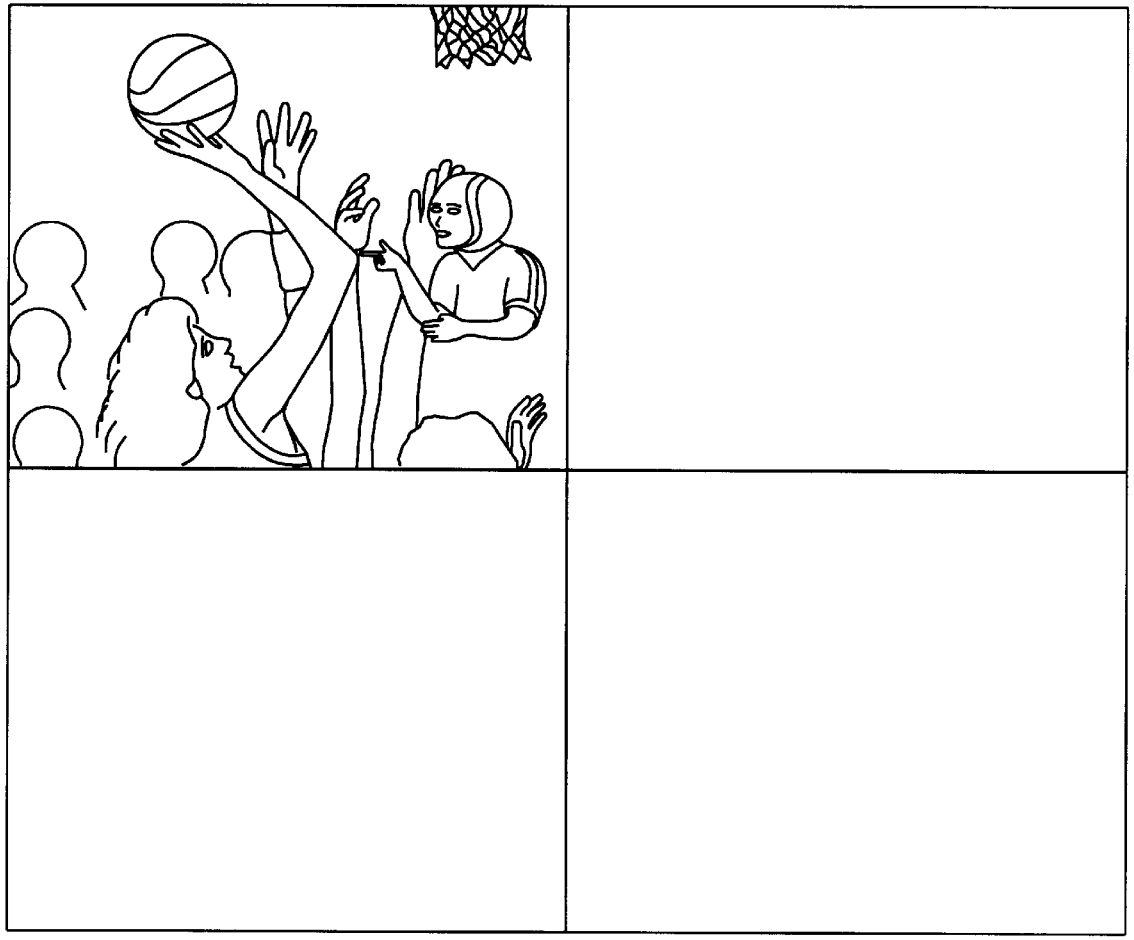
FIG. 20 is an illustrative display screen for a basketball instruction embodiment in accordance with the present invention.

FIG. 20 shows a four pane display for an illustrative basketball instruction embodiment in accordance with the present invention, including an animated instructor who narrates the proper movement for a particular basketball skill. For ease of illustration, the images have been omitted from three of the four panes. In accordance with this embodiment, basketball instruction is divided into 8 teaching sub-sessions: 1) passing; 2) pivoting; 3) dribbling and ball handling; 4) shooting; 5) offensive moves; 6) rebounding; 7) defense; and 8) post play. Each sub-session, in turn, may be divided into sub-categories, with each sub-category divided into a plurality of motion segments. For example, the shooting sub-session might include the following sub-categories: a) lay-up; b) foul shot; c) jump shot; d)bank shot; e) shooting off the screen. The lay-up sub-category, in turn, might be divided into the following motion segments: i) Ball Position and Approach; ii) Foot Movement; iii) Leg Movement; iv)Arm Extension; and v) Release to Target. The foul shot sub-category, in turn, might be divided into the following motion segments: i) Stance and Balance; ii) Arm and Ball Position; iii) Sighting the Target; and iv) Crouch, Extension, Release, and Follow-Through. Finally, the jump shot sub-category might be divided into the following motion segments: i) Stance and Balance; ii) Ball and Arm Position; iii) Squaring the Shoulders; iv) Sighting the Target; v) Extension; and vi)Release and Follow-Through. The animated instructor interacts with the images in the various panes of the display in the same manner as was described above with regard to FIGS. 1–18. As with the embodiment of FIGS. 1–18, the basketball instruction embodiment may utilize real-life, as well as animated, images.

What is claimed is:

1. A computerized method for illustrating, to a user, a plurality of human body motions relating to a sport, comprising the steps of:

dividing the sport into a plurality of motion segments, the plurality of motion segments including a first plurality of motion segments relating to a first skill of the sport and a second plurality of motion segments relating to a second skill of the sport;

displaying, on a display screen, a menu including the plurality of motion segments, the display screen being coupled to a computer;

accepting, as input to the computer from a user, a selection of one of the plurality of motion segments;

displaying, on the display screen, from at least two vantage points, a moving image of a generally human shaped actor performing the selected one of the plurality of motion segments.

2. The method of claim 1, further comprising providing, simultaneously with the display of the moving image of the generally human shaped actor, an image of an instructor on the display screen with the generally human shaped actor, and a corresponding audio narration of the moving image of the generally human shaped actor via a sound generation device coupled to the computer.

3. The method of claim 2, wherein the moving image is implemented with one or more compressed video objects and wherein the audio narration is implemented with one or more compressed audio objects.

4. The method of claim 3, wherein the instructor is implemented as a separate object.

5. The method of claim 2, wherein the instructor is in the form of an animated image.

6. The method of claim 2, wherein the instructor is in the form of a video image of a living human individual.

7. The method of claim 1, wherein the menu is divided into a first category and a second category, the first category corresponding to the first skill and the second category corresponding to the second skill, the first category of the menu including the first plurality of motion segments, the second category of the menu including the second plurality of motion segments.

8. The method of claim 7, wherein the sport is baseball.

9. The method of claim 7, wherein the sport is basketball.

10. The method of claim 1, wherein the step of displaying the moving image further comprises displaying on the display screen, simultaneously with the moving image, a stop button and a resume button, wherein the stop button, when actuated by a computer input device, causes the computer to pause the moving image, and wherein the resume button, when actuated by a computer input device, causes the computer to resume playing of the moving image.

11. The method of claim 1, wherein the step of displaying the moving image further comprises displaying on the display screen, simultaneously with the moving image, a toggle button, wherein the toggle button, when actuated by a computer input device, causes the computer to pause the moving image if the moving image is being played, and causes the computer to resume playing of the moving image if the moving image is paused.

12. The method of claim 1, wherein the generally human shaped actor is in the form of an animated image.

13. The method of claim 1, wherein the generally human shaped actor is in the form of a video image of a living human individual.

14. The method of claim 1, wherein for at least some of the plurality of motion segments, the computer displays four panels on the screen, with each panel containing an image of the generally human shaped actor performing the motion from a different vantage-point.

15. The method of claim 14, wherein the images in the panels move simultaneously.

16. The method of claim 14, wherein the images in the panels move sequentially.

17. The method of claim 14, wherein the sport is baseball.

18. The method of claim 14, wherein the sport is golf.

19. The method of claim 14, wherein the sport is basketball.

20. A computerized method for illustrating, to a user, a plurality of human body motions relating to a team sport, comprising the steps of:

dividing the team sport into a plurality of motion segments, wherein the team sport has a plurality of player positions, and wherein the plurality of motion segments further include a first plurality of motion segments relating to a first player position and a second plurality of motion segments relating to a second player position;

displaying, on a display screen, a menu including the plurality of motion segments, the display screen being coupled to a computer;

accepting, as input to the computer from a user, a selection of one of the plurality of motion segments;

displaying, on the display screen, from at least two vantage points, a moving image of a generally human shaped actor performing the selected one of the plurality of motion segments.

21. The method of claim 20, wherein the menu is divided into a first category and a second category, the first category corresponding to the first player position and the second category corresponding to the second player position, the first category of the menu including the first plurality of motion segments, the second category of the menu including the second plurality of motion segments.

22. The method of claim 21, wherein the sport is baseball.

23. The method of claim 21, wherein the sport is basketball.

* * * * *